US012562127B2

(12) United States Patent
An et al.

(10) Patent No.: US 12,562,127 B2
(45) Date of Patent: Feb. 24, 2026

(54) SCREEN DRIVE CIRCUIT, DISPLAY, AND ELECTRONIC DEVICE

(71) Applicant: Honor Device Co., Ltd., Shenzhen (CN)

(72) Inventors: Yabin An, Shenzhen (CN); Yi Su, Shenzhen (CN); Haiming He, Shenzhen (CN); Mingyuan Zhao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/703,084

(22) PCT Filed: Apr. 13, 2023

(86) PCT No.: PCT/CN2023/088038

§ 371 (c)(1),
(2) Date: Apr. 19, 2024

(87) PCT Pub. No.: WO2023/213175

PCT Pub. Date: Nov. 9, 2023

(65) Prior Publication Data

US 2025/0246148 A1 Jul. 31, 2025

(30) Foreign Application Priority Data

May 5, 2022 (CN) ........................ 202210482749.9

(51) Int. Cl.
*G09G 3/3266* (2016.01)

(52) U.S. Cl.
CPC ....... *G09G 3/3266* (2013.01); *G09G 2310/04* (2013.01); *G09G 2330/021* (2013.01)

(58) Field of Classification Search
None
See application file for complete search history.

(56) References Cited

U.S. PATENT DOCUMENTS 10,418,388 B2 9/2019 Kim et al.
11,244,629 B2 2/2022 Cho et al.
(Continued)

FOREIGN PATENT DOCUMENTS

CN 106663402 A 5/2017
CN 107958655 A 4/2018
(Continued)

*Primary Examiner* — Nitin Patel
*Assistant Examiner* — Amen W Bogale
(74) *Attorney, Agent, or Firm* — Slater Matsil, LLP

(57) ABSTRACT

This application provides a screen drive circuit, a display, and an electronic device. An input terminal of a drive selection circuit in the screen drive circuit inputs a row drive signal, and a control terminal of the drive selection circuit inputs a row address selection signal. The drive selection circuit outputs, based on the row address selection signal, the row drive signal corresponding to a pixel row whose displayed content changes. The row address selection signal is generated, by a display drive chip connected to the display, based on the pixel row whose displayed content changes. It can be learned that, the screen drive circuit can separately select, based on an update frequency of displayed content on the display, some pixel rows in a pixel array for content refreshing, thereby implementing local refreshing based on the displayed content.

20 Claims, 21 Drawing Sheets

(56) References Cited

U.S. PATENT DOCUMENTS

| | | | | |
|---|---|---|---|---|
| 11,462,170 | B2 | 10/2022 | Lim et al. | |
| 11,545,086 | B2 | 1/2023 | Wang | |
| 2013/0293529 | A1 | 11/2013 | You et al. | |
| 2016/0351160 | A1* | 12/2016 | In | G09G 3/3225 |
| 2020/0258454 | A1* | 8/2020 | Wang | G09G 3/3266 |
| 2021/0035489 | A1* | 2/2021 | Seo | G09G 3/035 |
| 2021/0110774 | A1 | 4/2021 | Heon et al. | |
| 2021/0193025 | A1 | 6/2021 | Xu et al. | |
| 2021/0335180 | A1 | 10/2021 | Sun | |

FOREIGN PATENT DOCUMENTS

| | | | |
|---|---|---|---|
| CN | 109410831 | A | 3/2019 |
| CN | 109637478 | A | 4/2019 |
| CN | 110491331 | A | 11/2019 |
| CN | 110910828 | A | 3/2020 |
| CN | 112231036 | A | 1/2021 |
| CN | 112652269 | A | 4/2021 |
| CN | 112992076 | A | 6/2021 |
| CN | 113808534 | A | 12/2021 |
| CN | 113963652 | A | 1/2022 |

* cited by examiner

SCREEN DRIVE CIRCUIT, DISPLAY, AND ELECTRONIC DEVICE

CROSS-REFERENCE TO RELATED APPLICATIONS

This application is a national stage of International Application No. PCT/CN2023/088038, filed on Apr. 13, 2023, which claims priority to Chinese Patent Application No. 202210482749.9, filed on May 5, 2022, both of which are incorporated herein by reference in their entireties.

TECHNICAL FIELD

This application relates to the field of display technologies, and in particular, to a screen drive circuit, a display, and an electronic device.

BACKGROUND

In recent years, organic light-emitting diode (organic light-emitting diode, OLED) displays are widely used in electronic products due to advantages such as a bright color, a high contrast ratio, and a high response speed.

Currently, a mainstream OLED driving manner is as follows: A data signal is linearly written under driving by a line scan signal (also referred to as GOA or a shift register), and is written by using a pixel signal on an entire screen, so as to implement content refreshing. However, global refreshing causes high power consumption and a long delay.

SUMMARY

In view of this, this application provides a screen drive circuit, a display, and an electronic device, to resolve at least some of the foregoing problems. This application discloses the following technical solutions.

According to a first aspect, this application provides a screen drive circuit, applied to a display and including an array drive circuit and a drive selection circuit. The array drive circuit includes a row drive circuit and a column drive circuit; the row drive circuit generates a row drive signal that is used to drive a pixel row in the display; and an input terminal of the drive selection circuit is connected to an output terminal of the row drive circuit, a control terminal of the drive selection circuit receives a row address selection signal to output, based on the row address selection signal, the row drive signal corresponding to a pixel row whose displayed content changes, and the row address selection signal is generated, by a display drive chip connected to the display, based on the pixel row whose displayed content changes. It can be learned that, in this solution, some pixel rows in an AMOLED screen can be refreshed based on displayed content that needs to be updated, instead of refreshing the entire AMOLED screen for update, thereby reducing power consumption of refreshing displayed content on the AMOLED screen and reducing a delay of content refreshing.

In a possible implementation of the first aspect, the drive selection circuit is configured to output the row drive signal when the row address selection signal is valid and mask the row drive signal when the row address selection signal is invalid. In this solution, some pixel rows in a pixel array can be separately selected based on an update frequency of displayed content on the display for content refreshing, in other words, displayed content in a region whose content is to be updated can be refreshed by using the drive selection circuit, without refreshing displayed content in a picture holding region.

In another possible implementation of the first aspect, the drive selection circuit includes a selection circuit and a drive circuit; an input terminal of the selection circuit is connected to the output terminal of the row drive circuit, a control terminal of the selection circuit receives the row address selection signal, and an output terminal of the selection circuit is connected to an input terminal of the drive circuit and is configured to output a pulse signal with a same frequency as the row drive signal when the row address selection signal is valid, and output a write invalid signal when the row address selection signal is invalid; and the drive circuit is configured to generate, based on the pulse signal, a write drive signal output with a driving capability, or output the write invalid signal.

In still another possible implementation of the first aspect, the row address selection signal is valid when it is a low-level signal and invalid when it is a high-level signal.

In still another possible implementation of the first aspect, the selection circuit includes a first series branch, a second series branch, a third series branch, and a fourth series branch; the first series branch includes a first switching transistor and a second switching transistor that are connected in series, a control terminal of the first switching transistor is the input terminal of the selection circuit, a control terminal of the second switching transistor inputs a first voltage signal, and a first terminal of the first switching transistor is the output terminal of the selection circuit; the second series branch is connected in parallel to the first series branch, the second series branch includes a third switching transistor and a fourth switching transistor that are connected in series, a common terminal of the third switching transistor and the fourth switching transistor inputs a negative voltage signal, a first terminal of the third switching transistor is connected to the output terminal of the selection circuit, gates of the third switching transistor and the fourth switching transistor are connected to a second terminal of the fourth switching transistor, and the second terminal of the fourth switching transistor is connected to the first series branch; the third series branch includes a fifth switching transistor and a sixth switching transistor that are connected in series, a first terminal of the fifth switching transistor inputs the negative voltage signal, a second terminal of the sixth switching transistor inputs a positive voltage signal, and gates of the fifth switching transistor and the sixth switching transistor are connected to a common terminal of the first switching transistor and the second switching transistor; and the fourth series branch includes a seventh switching transistor and an eighth switching transistor that are connected in series, a first terminal of the seventh switching transistor inputs the positive voltage signal, a second terminal of the eighth switching transistor inputs the negative voltage signal, gates of the seventh switching transistor and the eighth switching transistor are connected to a serially-connected node of the fifth switching transistor and the sixth switching transistor and input the row address selection signal, and a serially-connected node of the seventh switching transistor and the eighth switching transistor is connected to the common terminal of the first switching transistor and the second switching transistor.

In still another possible implementation of the first aspect, the drive circuit includes a first CMOS inverter, an input terminal of the first CMOS inverter is connected to the output terminal of the selection circuit, an output terminal of the first CMOS inverter is an output terminal of the drive selection circuit, a first power terminal of the first CMOS inverter inputs the positive voltage signal, and a second power terminal of the first CMOS inverter inputs the negative voltage signal.

In still another possible implementation of the first aspect, the selection circuit includes: a control terminal of a ninth switching transistor inputs the row address selection signal, and a first terminal of the ninth switching transistor inputs the positive voltage signal; a tenth switching transistor is connected in series to an eleventh switching transistor, a first terminal of the tenth switching transistor is connected to a second terminal of the ninth switching transistor, a control terminal of the tenth switching transistor inputs the first voltage signal, a second terminal of the eleventh switching transistor inputs the negative voltage signal, and a control terminal of the eleventh switching transistor is connected to a first terminal of the eleventh switching transistor; and a twelfth switching transistor is connected in series to a thirteenth switching transistor, a control terminal of the twelfth switching transistor is connected to the output terminal of the row drive circuit, a second terminal of the twelfth switching transistor is connected to a common node of the tenth switching transistor and the ninth switching transistor, a second terminal of the thirteenth switching transistor inputs the negative voltage signal, and a common terminal of the twelfth switching transistor and the thirteenth switching transistor is connected to the input terminal of the drive circuit.

In still another possible implementation of the first aspect, the selection circuit includes: a fourteenth switching transistor, a fifteenth switching transistor, and a sixteenth switching transistor that are sequentially connected in series, where a first terminal of the fourteenth switching transistor inputs the positive voltage signal, and a second terminal of the sixteenth switching transistor inputs the negative voltage signal; control terminals of the fourteenth switching transistor and the sixteenth switching transistor are connected to the row drive circuit, and a control terminal of the fifteenth switching transistor inputs the row address selection signal; a common terminal of the fifteenth switching transistor and the sixteenth switching transistor is connected to the input terminal of the drive circuit; and a first terminal of a seventeenth switching transistor is connected to a second terminal of the fifteenth switching transistor, a second terminal of the seventeenth switching transistor inputs the negative voltage signal, and a control terminal of the seventeenth switching transistor inputs the row address selection signal.

In still another possible implementation of the first aspect, the selection circuit includes: a second CMOS inverter, a third CMOS inverter, a fifth series branch, a fourth CMOS inverter, and a fifth CMOS inverter; an input terminal of the second CMOS inverter is connected to an output terminal of the row drive circuit, and an output terminal of the second CMOS inverter is connected to an input terminal of the third CMOS inverter; the fifth series branch includes an eighteenth switching transistor, a nineteenth switching transistor, and a twentieth switching transistor that are sequentially connected in series, a first terminal of the eighteenth switching transistor inputs the positive voltage signal, and a second terminal of the twentieth switching transistor inputs the negative voltage signal; and control terminals of the eighteenth switching transistor and the twentieth switching transistor are connected to an output terminal of the third CMOS inverter, and a common terminal of the nineteenth switching transistor and the twentieth switching transistor is connected to the input terminal of the drive circuit; an input terminal of the fourth CMOS inverter inputs the row address selection signal, and an output terminal of the fourth CMOS inverter is connected to an input terminal of the fifth CMOS inverter; and an output terminal of the fifth CMOS inverter is connected to control terminals of a twenty-first switching transistor and the nineteenth switching transistor, and a first terminal of the twenty-first switching transistor is connected to the input terminal of the drive circuit.

In still another possible implementation of the first aspect, the selection circuit includes: a sixth CMOS inverter, a sixth series branch, a seventh series branch, an eighth series branch, a seventh CMOS inverter, an eighth CMOS inverter, and a ninth CMOS inverter; an input terminal of the sixth CMOS inverter inputs the row address selection signal; and the sixth series branch includes a twenty-second switching transistor, a control terminal of the twenty-second switching transistor is connected to an output terminal of the sixth CMOS inverter, a first terminal of the twenty-second switching transistor inputs the positive voltage signal, and a second terminal of the twenty-second switching transistor is connected to a first common node; the seventh series branch includes a twenty-third switching transistor, a control terminal of the twenty-third switching transistor is connected to a second common node, a first terminal of the twenty-third switching transistor inputs the positive voltage signal, and a second terminal of the twenty-third switching transistor is connected to the first common node; the eighth series branch includes a twenty-fourth switching transistor and a twenty-fifth switching transistor that are connected in series, a control terminal of the twenty-fourth switching transistor is connected to the second common node and a second terminal of the twenty-fourth switching transistor inputs the negative voltage signal, and a control terminal of the twenty-fifth switching transistor is connected to the output terminal of the sixth CMOS inverter; an input terminal of the seventh CMOS inverter is connected to an output terminal of the eighth CMOS inverter, and an input terminal of the eighth CMOS inverter is connected to the output terminal of the row drive circuit; and an input terminal of the ninth CMOS inverter is connected to the first common node, and an output terminal of the ninth CMOS inverter is connected to the input terminal of the drive circuit.

According to a second aspect, this application further provides a display, including pixels, a pixel drive array circuit, and the screen drive circuit according to any one of the possible implementations of the first aspect. An output terminal of the screen drive circuit is coupled to a row drive signal of the pixel drive array circuit. In this way, the display can selectively drive some pixel rows in the pixel array based on update of displayed content, in other words, an effective display region of the display can be divided into at least two different working partitions. Each work partition can separately refresh displayed content, for example, refresh the displayed content at a different refresh rate. In addition, the working partitions are dynamically adjusted based on change data (Δdata) of the displayed content, that is, locations of the working partitions on the display are unfixed. An operation unit of a row drive circuit in each working partition may be a single sub-pixel (for example, for an R-type OLED, a G-type OLED, or a B-type OLED), or may be a quasi-pixel (for example, for an RB-type OLED) formed by a plurality of sub-pixels.

According to a third aspect, this application provides an electronic device. The electronic device includes one or more processors, a memory, and the display according to the second aspect.

It should be understood that descriptions of technical features, technical solutions, beneficial effects, or similar expressions in this application do not imply that all features and advantages can be achieved in any single embodiment. On the contrary, it may be understood that descriptions of features or beneficial effects mean that specific technical features, technical solutions or beneficial effects are included in at least one embodiment. Therefore, the descriptions of the technical features, the technical solutions, or the beneficial effects in the specification do not necessarily mean the same embodiment. Further, the technical features, the technical solutions, and the beneficial effects described in the embodiments may be combined in any appropriate manner. A person skilled in the art should understand that an embodiment may be implemented without one or more specific technical features, technical solutions, or beneficial effects in a specific embodiment. In other embodiments, additional technical features and beneficial effects may also be identified in specific embodiments that do not reflect all embodiments.

BRIEF DESCRIPTION OF THE DRAWINGS

To describe the technical solutions in embodiments of the present invention or the conventional technology more clearly, the following briefly describes the accompanying drawings required for describing the embodiments or the conventional technology. It is clear that, the accompanying drawings in the following description show some embodiments of the present invention, and a person of ordinary skill in the art may still derive other drawings from these accompanying drawings without creative efforts.

DETAILED DESCRIPTION OF THE EMBODIMENTS

The terms "first", "second", "third", and the like in the specification, claims, and accompanying drawings of this application are used to distinguish between different objects, but are not used to limit a specific sequence.

In embodiments of this application, words such as "example" or "for example" are used to represent giving an example, an illustration, or a description. Any embodiment or design solution described as "example" or "for example" in embodiments of this application should not be construed as being more preferred or advantageous than other embodiments or design solutions. Specifically, the words such as "example" or "for example" are used to present related concepts in a specific manner.

For clarity and brevity of the following embodiments, a brief description of a related technology is first provided.

AMOLED: Active-matrix organic light-emitting diode. An active-matrix organic light-emitting diode is a form of an OLED. "AM" indicates that a driving manner of each OLED pixel is active driving, that is, a TFT layer and a capacitor layer are mounted on each OLED, featuring characteristics such as a relatively high response speed, a higher contrast ratio, and a relatively wide angle of view.

Refresh rate: indicates a frequency at which an electronic device displays frames, in a unit of Hz. In short, a screen refresh rate is a quantity of times that a screen can be refreshed per second. A higher screen refresh rate leads to a smoother dynamic picture display, but the high refresh rate also increases system power consumption and causes a problem such as heating of an electronic device.

PMOS: positive channel Metal Oxide Semiconductor, p-channel metal oxide semiconductor.

NMOS: N-Metal-Oxide-Semiconductor, N-channel metal oxide semiconductor.

LTPS: Low Temperature Poly-silicon, low temperature poly-silicon.

IGZO: indium gallium zinc oxide, indium gallium zinc oxide.

Figure 1:
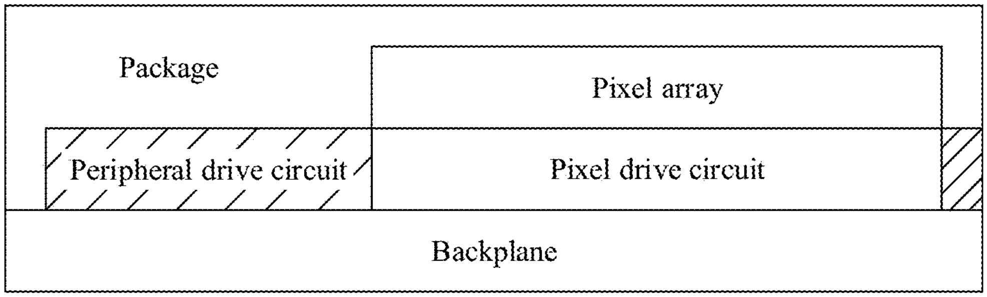
FIG. 1 is a schematic diagram of a structure of an AMOLED display according to an embodiment of this application.

The following first describes a structure of an AMOLED. As shown in FIG. 1, an AMOLED screen mainly includes a pixel array in the middle, a pixel drive circuit located below the pixel array, a peripheral drive circuit at a same layer as the pixel drive circuit, and a support backplane below the peripheral drive circuit and a packaging layer at the top.

The pixel array is an effective display region of an AMOLED display, and is configured to display content. For example, a typical distribution of the pixel array is an array of 1920*1080 pixels. Each pixel in the pixel array includes an RGB light-emitting diode, that is, an RGBOLED.

The pixel drive circuit and the peripheral drive circuit may also be referred to as an ActiveMatrix (active matrix). In the AMOLED display, a DDIC and the ActiveMatrix drive the RGBOLED to perform color mixing, so as to convert image displayed content into an optical signal of the display.

Figure 2:
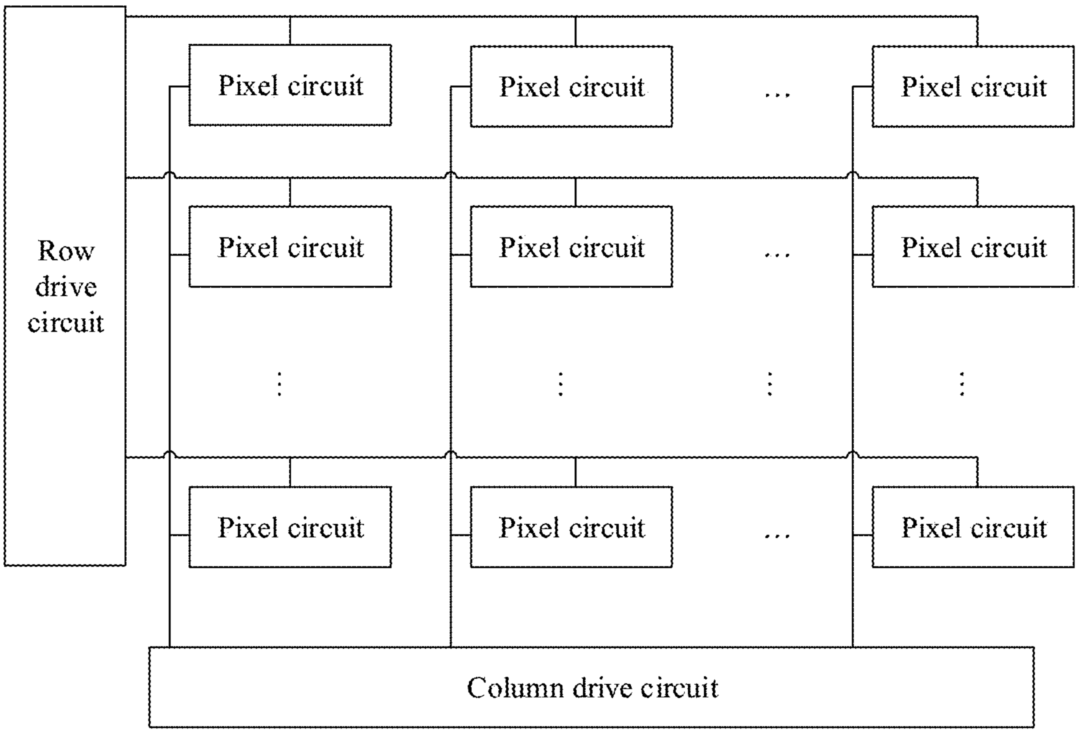
FIG. 2 is a schematic diagram of a structure of a peripheral drive circuit according to an embodiment of this application.

In an example embodiment, as shown in FIG. 2, the peripheral drive circuit (or referred to as an array drive circuit) includes a row drive circuit and a column drive circuit.

The row drive circuit receives a serial bus clock signal output by the DDIC, and writes the serial bus clock signal to a pixel circuit based on a DDIC clock sequence. The row drive circuit is configured to convert a serial clock of the DDIC into a sequential write pulse with a driving capability, and is essentially a linear controller. The linear controller is disadvantageous in a unitary direction, that is, scanning from a first line to an $N^{th}$ line, or scanning from an end line (endLine) to a first line (firstLine).

The column drive circuit writes a Data line led out from the DDIC to a pixel circuit directly or through a time shifter (multiplexer, MUX). A data signal is linearly written to a pixel circuit under driving by a row drive signal, thereby implementing content update on the entire screen.

Figure 3:
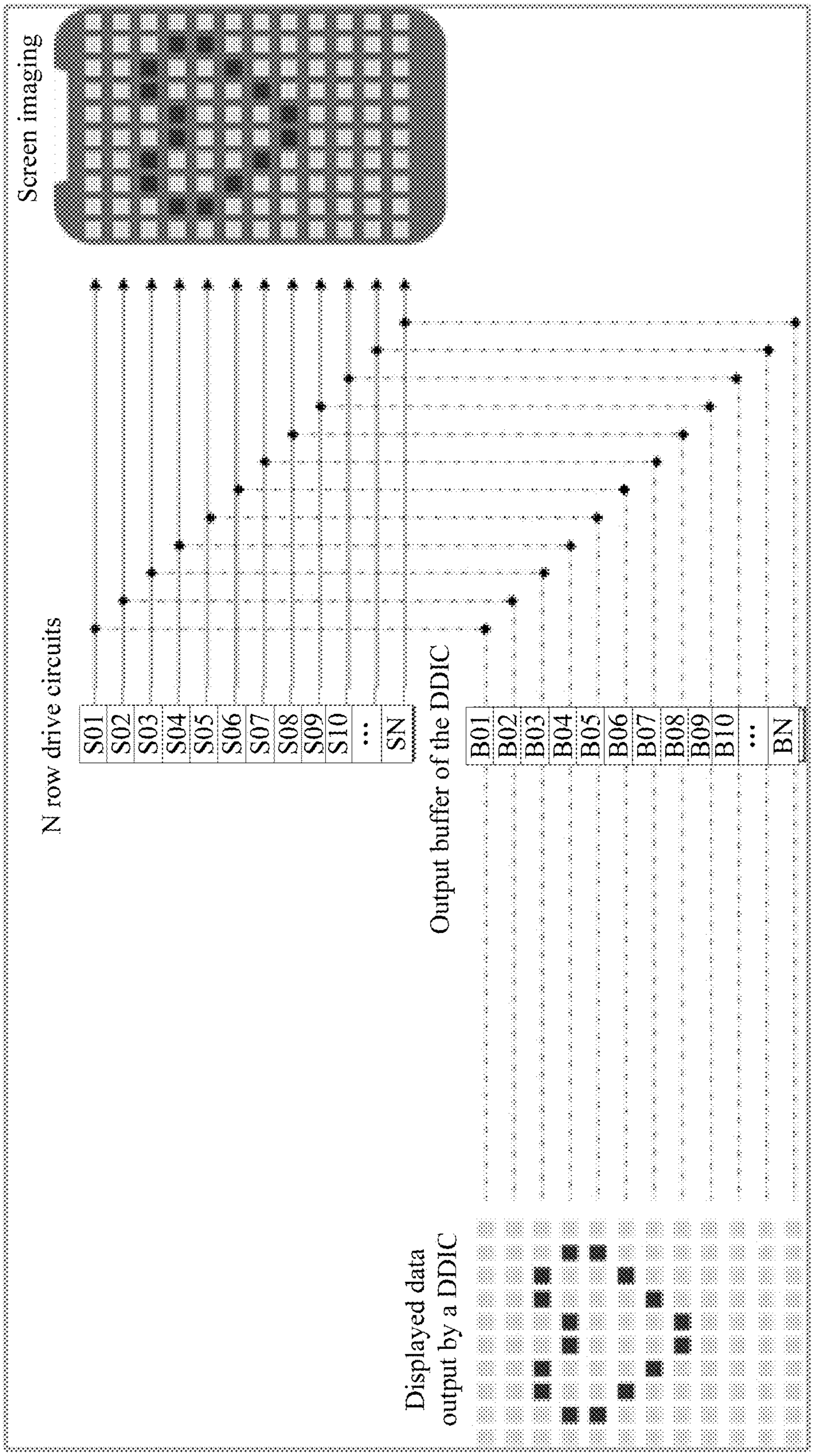
FIG. 3 is a schematic diagram of a principle of a conventional row driving process according to an embodiment of this application.

It can be learned that, currently, a mainstream OLED driving manner is as follows: A data signal is linearly written under driving by a line scan signal, and content on the entire screen is refreshed. For example, as shown in FIG. 3, it is assumed that the screen includes 12*10 pixels, that is, 12 rows and 10 columns of pixels. Content that needs to be displayed is a heart shape (16 pixels in total) in the middle. Based on a current driving manner of progressive scanning, a refresh area is 100%, that is, pixels on the entire screen are refreshed, causing problems of high power consumption and a long delay.

Figure 4:
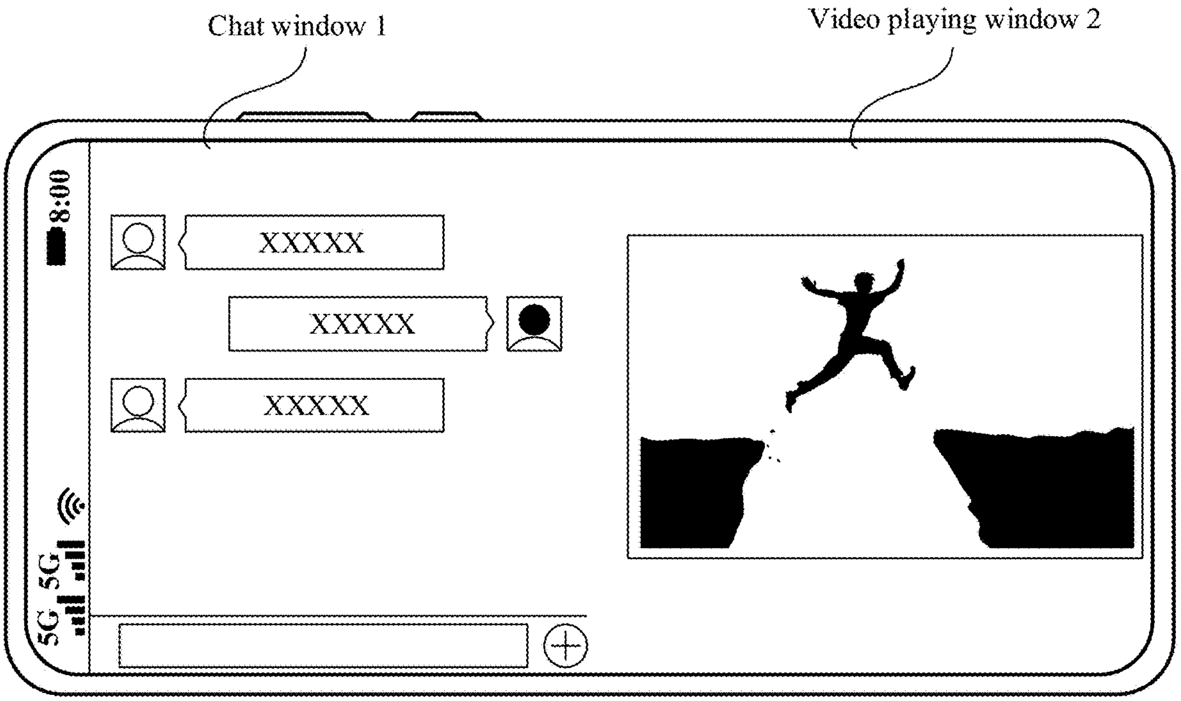
FIG. 4 is a schematic diagram of an application scenario with a plurality of display windows according to an embodiment of this application.

For another example, that an electronic device is a mobile phone or a tablet is used as an example. In a typical application scenario, a screen is divided into two display windows. As shown in FIG. 4, one is a chat window 1, and the other is a video playing window 2. For the chat window 1, a content change rate of this window is low, and this region needs a relatively low refresh rate theoretically, for example, 30 Hz. For the video playing window 2, a content change rate of this window is high, and this region needs a relatively high refresh rate, for example, 120 Hz or 60 Hz. Therefore, in this application scenario, a refresh rate of the entire screen needs to be set to meet a requirement of a window with a highest requirement, that is, a refresh rate requirement of the video playing window 2, that is, 120 Hz or 60 Hz. Consequently, a display window that does not require a high refresh rate also has to use a high refresh rate. As a result, power consumption is high and a delay is long.

According to the foregoing row driving manner of the AMOLED, in a scenario in which only content of some pixels needs to be refreshed on the AMOLED screen and content of some pixels does not need to be refreshed, content still needs to be refreshed on the entire screen. In this case, write power consumption of the content is high. In addition, a delay in this linear write manner is long, and a feedback delay requirement of an I/O device such as an active stylus may not be met. In addition, the foregoing row driving manner of the AMOLED cannot be applied to a split-screen driving scenario. For example, a large screen of a foldable machine may be divided into at least two screens to display different content.

To resolve the foregoing problems existing in the row driving manner of the AMOLED screen, this application provides a screen drive circuit. The screen drive circuit includes a pixel drive circuit, an array drive circuit (including a row drive circuit), and a drive selection circuit. The drive selection circuit is coupled to the array drive circuit, a control terminal of the drive selection circuit is connected to a signal output terminal (a row address selection signal) of a DDIC, and an output terminal of the drive selection circuit is coupled to a pixel row drive signal (such as an output-level gate line). When the row address selection signal output by the DDIC is valid, the output terminal of the drive selection circuit outputs a write drive signal output by a GOA circuit; and when the row address selection signal output by the DDIC is invalid, the drive selection circuit outputs a write invalid signal, that is, drives a corresponding pixel row to update corresponding content data. That is, displayed content in a region whose content is to be updated is refreshed by using the drive selection circuit, without refreshing displayed content in a picture holding region. In other words, the AMOLED screen is actively refreshed based on displayed content or an application (different windows display different applications in the application scenario shown in FIG. 4). It can be learned that, in this solution, some pixel rows in the AMOLED screen can be refreshed based on displayed content that needs to be updated, instead of refreshing the entire AMOLED screen for update, thereby reducing power consumption of refreshing displayed content on the AMOLED screen, reducing a delay of content refreshing, and further effectively reducing a feedback delay requirement of an I/O device such as an active stylus. In addition, the drive solution may be further applied to a split-screen driving scenario, so as to extend an application scope of the AMOLED screen.

The following describes in detail, with reference to accompanying drawings, the screen drive circuit and its working process that are provided in embodiments of this application.

In this specification, that the row drive circuit is a GOA circuit is used as an example for description. As described above, the array drive circuit may alternatively be another type of drive circuit, such as an EM drive circuit. A type of the array drive circuit is not limited in this specification.

Figure 5:
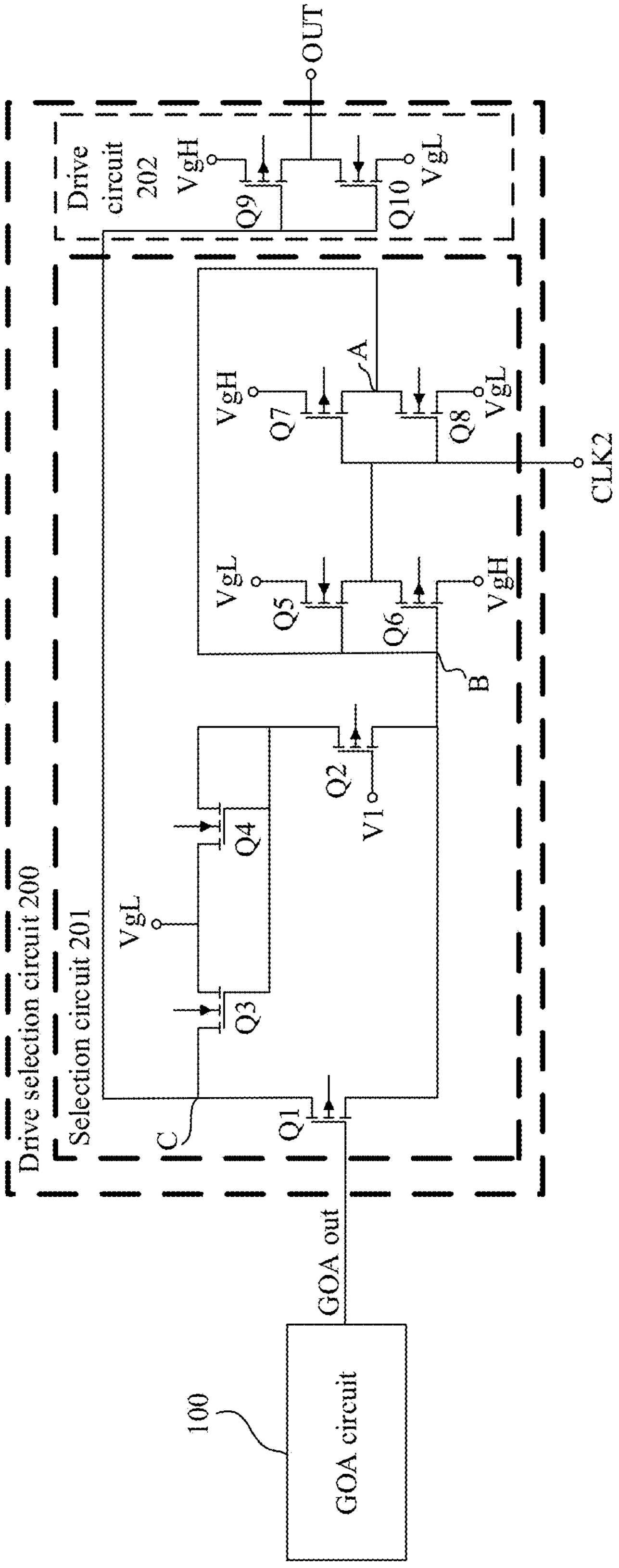
FIG. 5 is a diagram of a principle of a drive circuit of a screen according to an embodiment of this application.

FIG. 5 is a schematic diagram of a principle of a row drive circuit of a screen according to an embodiment of this application.

As shown in FIG. 5, the row drive circuit of the screen includes a GOA circuit 100 and a drive selection circuit 200.

The GOA circuit 100 is a row drive circuit of a row of pixels in a pixel array. An input terminal of the GOA circuit 100 is connected to an output terminal of the DDIC, and separately receives a start signal (STV) and two clock signals (CLK1 and CKB) that are sent by the DDIC, so as to receive a serial clock signal output by the DDIC, and write data to the pixel drive circuit based on a serial clock sequence, that is, output a write drive signal.

In an example, the GOA circuit may include at least one GOA unit. One GOA unit is configured to separately drive an R (red) pixel, a G (green) pixel, or a B (blue) pixel. This application sets no limitation on a quantity of GOA units included in the GOA circuit.

An input terminal of the drive selection circuit 200 is connected to an output terminal of the GOA circuit 100, and a control terminal of the drive selection circuit 200 is connected to a control signal output terminal of the DDIC. The drive selection circuit 200 is configured to determine, based on a control signal CLK2 output by the DDIC, whether the output drives a pixel circuit of a connected row to refresh displayed content. Specifically, if CLK2 is valid, the write drive signal output by the GOA circuit 100 is output to a row of pixel drive circuit connected to a subsequent stage, that is, provides the write drive signal for this row of pixel circuit. If CLK2 is invalid, the write drive signal at the output terminal of the GOA circuit 100 is masked, that is, displayed content of this row of pixel circuit is kept unchanged.

In an example embodiment, the drive selection circuit 200 may include a selection circuit 201 and a drive circuit 202.

The selection circuit 201 includes an input terminal and a control terminal. The input terminal of the selection circuit 201 is the input terminal of the drive selection circuit 200, and the control terminal of the selection circuit 201 is the control terminal of the drive selection circuit 200, and is connected to the control signal output terminal of the DDIC.

The input terminal of the selection circuit 201 is connected to the output terminal of the GOA circuit 100, and an output terminal of the selection circuit 201 is further connected to an input terminal of the drive circuit 202. An output terminal of the drive circuit 202 is an output terminal of the drive selection circuit 200, and is connected, through one row line in row and column lines, to a pixel circuit of this row.

The selection circuit 201 determines, based on CLK2 input by the control terminal, whether to output the write drive signal output by the GOA circuit 100. If CLK2 is valid, a write pulse signal is transferred to the drive circuit 202 at a subsequent stage. The write pulse signal and the write drive signal output by the GOA circuit 100 have a same cycle but opposite directions.

The drive circuit 202 converts the write pulse signal into a drive signal with a driving capability, and transmits the drive signal to a row of pixel circuit connected to the drive circuit 202, so that data is written to the corresponding pixel circuit based on a data signal provided by a column drive circuit, that is, displayed content of the pixel is refreshed.

In an example embodiment, as shown in FIG. 5, the selection circuit 201 may include switching transistors Q1~Q8.

Q1 and Q2 are connected in series to obtain a first series branch, Q3 and Q4 are connected in series to obtain a second series branch, and the first series branch is connected in parallel to the second series branch.

A gate of Q1 is the input terminal of the selection circuit 201, a second terminal of Q1 is connected to a second terminal of Q2, and a first terminal of Q1 is connected to a first terminal of Q3. In addition, the first terminal of Q1 is further connected to the input terminal of the drive circuit 202. A second terminal of Q3 is connected to a first terminal of Q4, a second terminal of Q4 is connected to a first terminal of Q2, and a common terminal of Q3 and Q4 inputs a negative voltage signal VgL (for example, −8 V). Gates of Q3 and Q4 are connected, and then are connected to the second terminal of Q4. A gate of Q2 inputs a first voltage signal V1. The first voltage signal V1 is a low-level signal, such as a 0 V voltage signal or a direct-current voltage.

Q5~Q7 form two stages of lock circuits. Q5 and Q6 are one stage of lock circuit, and Q7 and Q8 are the other stage of lock circuit.

Q5 and Q6 are connected in series between the negative voltage signal VgL and a positive voltage signal VgH (for example, +8 V). A first terminal of Q5 inputs the negative voltage signal VgL, and a second terminal of Q6 inputs the positive voltage signal VgH. Gates of Q5 and Q6 are connected to the second terminal of Q2 (that is, node B).

A first terminal of Q7 inputs the positive voltage signal VgH, a second terminal of Q7 is connected to a first terminal of Q8, and a second terminal of Q8 inputs the negative voltage signal VgL. Gates of Q7 and Q8 input the control signal CLK2. In addition, Q7 and Q8 have a common terminal (that is, a node A).

The drive circuit 202 includes switching transistors Q9 and Q10. A first terminal of Q9 inputs the positive voltage signal VgH, a second terminal of Q9 is connected to a first terminal of Q10, and a second terminal of Q10 inputs the negative voltage signal VgL. In addition, a drain-source common terminal of Q9 and Q10 (that is, a serially-connected node of Q9 and Q10) is the output terminal OUT of the drive circuit. Gates of Q9 and Q10 are the input terminal of the drive circuit 202, and are connected to the first terminal of Q1.

In addition, in another embodiment, to improve drive timeliness of the drive circuit, that is, to enable a drive signal output by the drive circuit to quickly meet a drive requirement, Q9 and Q10 may be separately a switching transistor group obtained by connecting a plurality of switching transistors of a same type in parallel, and this application sets no limitation on a quantity of switching transistors connected in parallel.

In the foregoing embodiment, the switching transistors Q1, Q2, Q6, and Q7 are PMOS transistors, which may be specifically LTPS-PMOSs. Q3, Q4, Q5, and Q8 may be NMOSs, which may be specifically IGZO-NMOSs.

This application sets no limitation on a type of each switching transistor in the drive selection circuit. For example, Q1 may alternatively be an NMOS transistor, and another switching transistor in a corresponding circuit may be a semiconductor transistor of a corresponding type. This application sets no limitation thereto.

Figure 6:
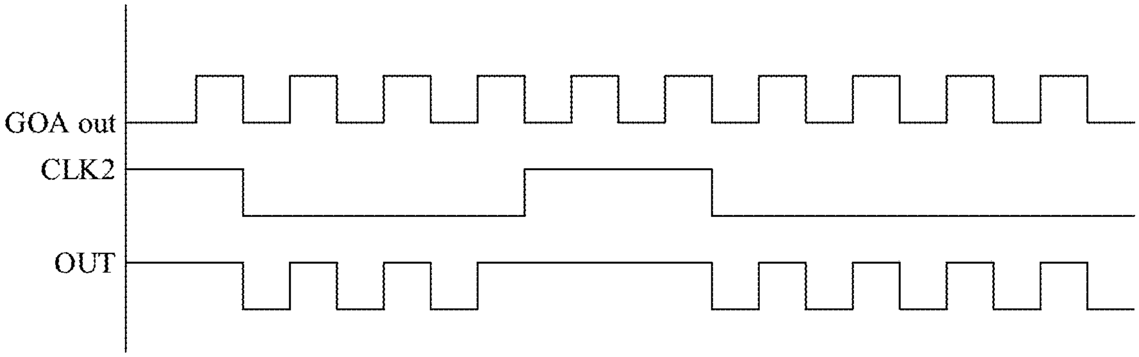
FIG. 6 is a diagram of a voltage signal waveform of each node in the circuit shown in FIG. 5.

FIG. 6 is a schematic diagram of waveforms of signals in a drive selection circuit according to an embodiment of this application. GOA out is an output signal of the GOA circuit, CLK2 is a control signal output by the DDIC, and OUT is a signal output by the drive selection circuit 200.

As shown in FIG. 6, when CLK2 is a low-level signal, the drive selection circuit 200 transmits, to a pixel drive circuit at a subsequent stage, the write drive signal output by the GOA circuit 100, so as to drive a pixel of a corresponding row to refresh content. That is, a waveform of the OUT signal output by the drive selection circuit 200 is the same as a pulse signal waveform of GOA out. When CLK2 has a high level, the write drive signal output by the GOA circuit 100 is masked, that is, the write drive signal corresponding to this row of pixels is masked. In other words, displayed content of this row of pixel circuit is not refreshed. As shown in FIG. 6, when CLK2 has a high level, the OUT signal output by the drive selection circuit 200 is also a high-level signal, that is, a write invalid signal.

Figure 7:
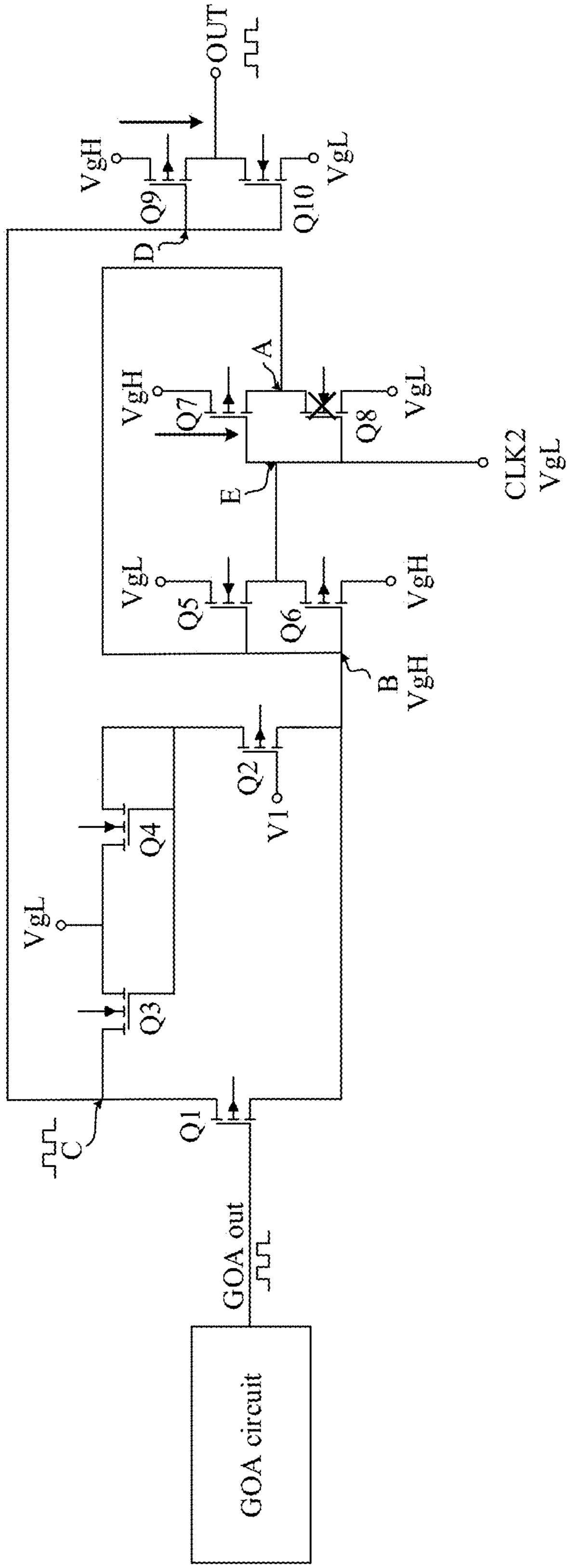
FIG. 7 is an equivalent circuit diagram of the circuit shown in FIG. 5 in a case that a row address selection signal is valid.
Figure 8:
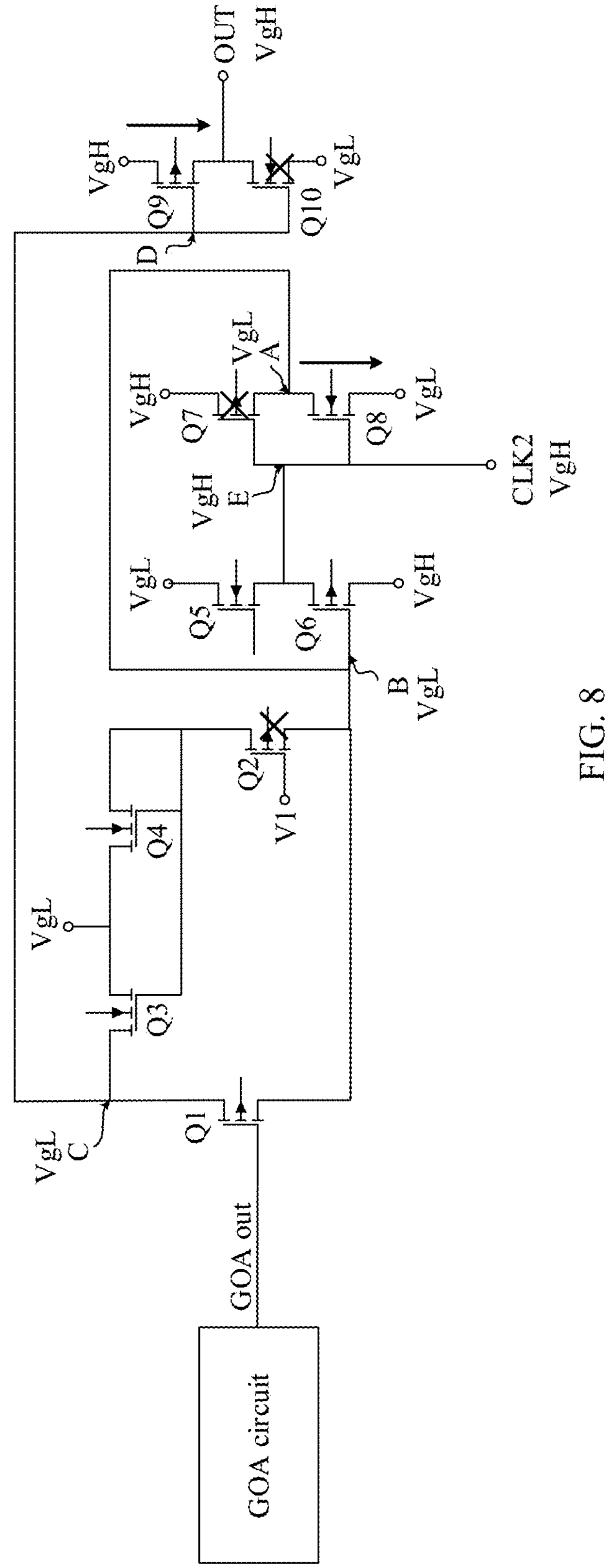
FIG. 8 is an equivalent circuit diagram of the circuit shown in FIG. 5 in a case that a row address selection signal is invalid.

The following describes in detail a working process of the drive selection circuit 200 shown in FIG. 5 with reference to FIG. 7 and FIG. 8.

FIG. 7 is a diagram of a circuit principle corresponding to a drive selection circuit in a case that CLK2 is valid. In this embodiment, that CLK2 is valid at a low level is used as an example for description. In another embodiment of this application, CLK2 may be valid at a high level, and the drive selection circuit needs to be adaptively adjusted. Details are not described herein again. A type of a valid level of CLK2 is not limited in this application.

In the drive selection circuit shown in FIGS. 7, Q3 and Q4 are in a high-resistance state, and Q1 and Q3 are equivalent to a resistor with a high resistance after being connected in series. Similarly, Q2 and Q4 are also equivalent to a resistor with a high resistance.

As shown in FIG. 7, when CLK2 has a low level, Q7 is on and Q8 is off, and a voltage at point A is a positive voltage signal VgH. In addition, VgH at point A is transmitted to point B, that is, a voltage at point B is close to VgH. Therefore, Q5 is triggered to be on. Further, VgL is transmitted to point E by using Q5, that is, a gate voltage of Q7 is kept at VgL, thereby completing reverse charging to CLK2.

In addition, after the voltage at point B is pulled up, a voltage difference between Q1 and Q3 is VgH-VgL. When the gate of Q1 inputs a pulse signal (that is, the write drive signal), a pulse signal at a same frequency is differentially output from point C, that is, the input terminal (that is, point D) of the drive circuit inputs the pulse signal. After enhancement by the drive circuit through driving, a pulse signal that has a same frequency as the pulse signal output from point C and that has a driving capability is output from the output terminal OUT. It can be learned that, when CLK2 is valid, the write drive signal output by the GOA circuit is output at the output terminal OUT. As shown in FIG. 8, when CLK2 has a high level, Q7 is off, Q8 is on, and VgL is transmitted to point A by using Q8. Further, the voltage at point B is pulled down to a low level, that is, both branches of Q1 and Q3 have a low potential near VgL. Therefore, a potential at point C is pulled down to near VgL. Further, a potential at point D is also pulled down, so that Q9 is on, and the output terminal OUT constantly has VgH, that is, a write invalid signal.

A signal finally output by the output terminal OUT of 200 is also a high-level signal, that is, an invalid signal.

The foregoing content is described by using a driving process of one row of pixels as an example. A driving process of another pixel row is the same, and whether to output a corresponding write drive signal is chosen based on a received CLK2 signal.

Figure 9:
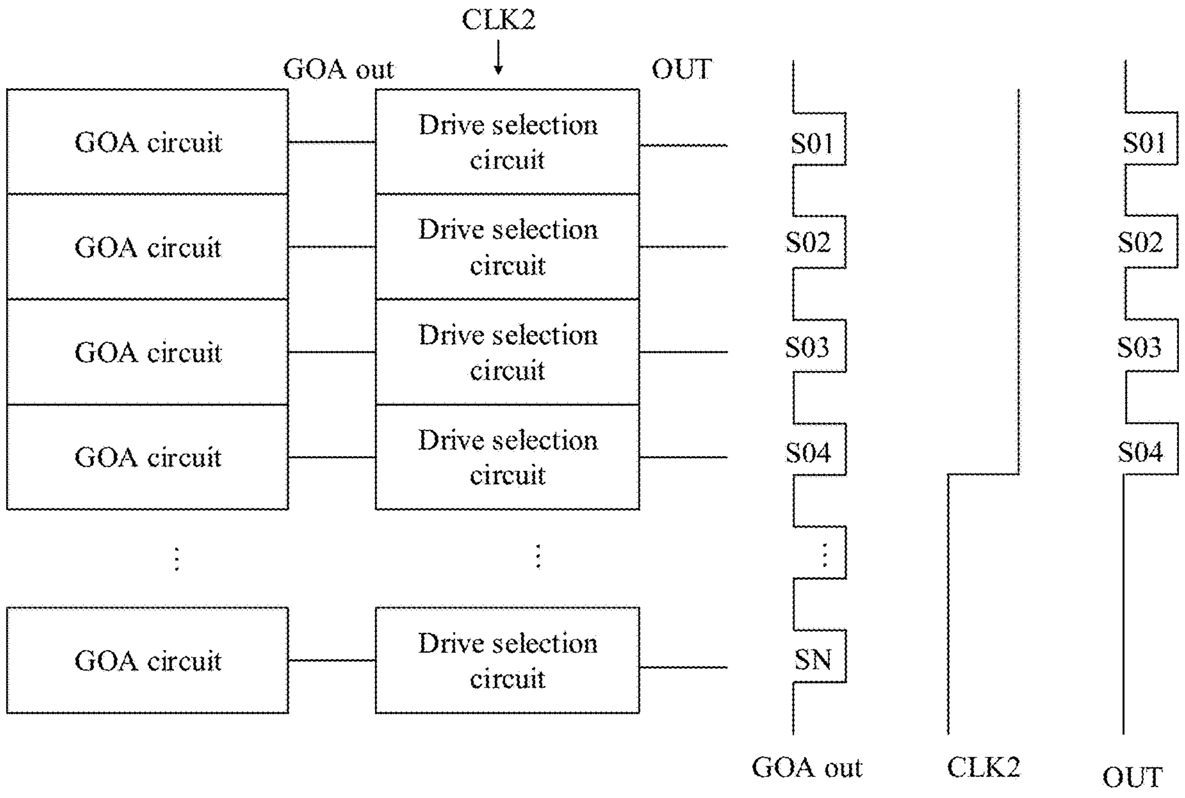
FIG. 9 is a schematic diagram of a plurality of row drive circuits according to an embodiment of this application.

FIG. 9 is a schematic diagram of a plurality of row drive circuits according to an embodiment of this application.

As shown in FIG. 9, each row drive circuit includes one GOA circuit and one drive selection circuit. An output signal of each GOA circuit is a GOA out signal waveform, that is, all rows (S01~SN) of pixels need to refresh displayed content, and CLK2 is a control signal for row address selection. That CLK2 is valid at a low level is used as an example. When CLK2 has a low level, an OUT signal finally output by each drive selection circuit includes only a row drive signal corresponding to a row whose displayed content is to be updated. For a row whose content is not to be updated, an invalid signal is output.

As shown in FIG. 9, if row addresses selected based on CLK2 signals are S01~S04, S01~S04 in the OUT signal are write drive signals (that is, pulse signals), and all other rows are corresponding to high-level signals. It can be learned that the CLK2 signal is a control signal for row address selection, or is referred to as a row selection signal. When a CLK2 signal corresponding to a row of pixels is valid, a row drive signal corresponding to the row of pixels is output. When a CLK2 signal corresponding to a row of pixels is invalid, a row drive signal corresponding to the row of pixels is masked. In coordination with address selection in a column direction, only displayed content of a partial display region of the screen is refreshed based on the displayed content.

Figure 10:
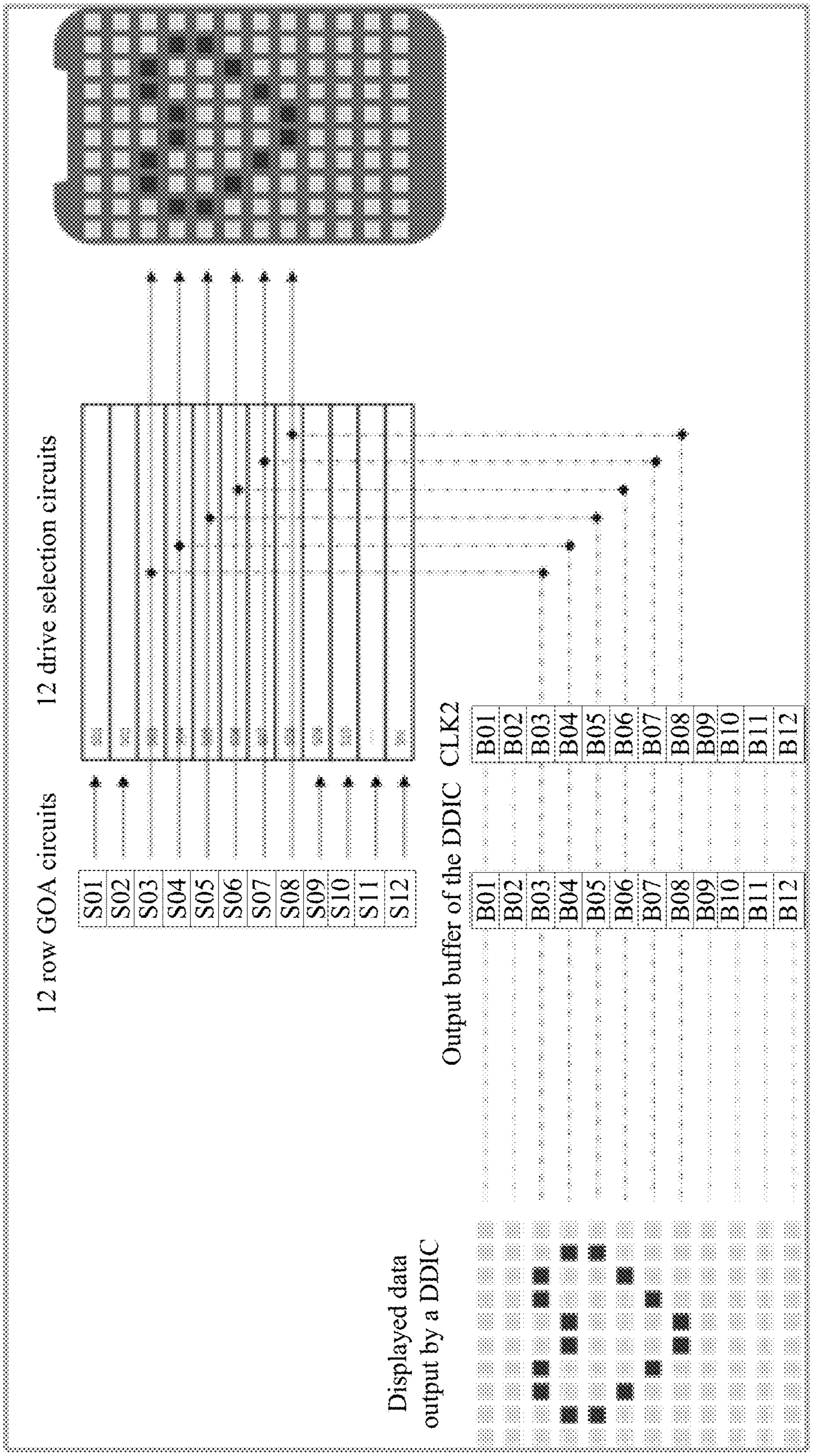
FIG. 10 is a schematic diagram of a row driving process of a screen according to an embodiment of this application.

As shown in FIG. 10, a 12*10 pixel array is used as an example for description. An output terminal of each row of GOA circuit is connected to a drive selection circuit, an output buffer of the DDIC outputs a serial clock signal, and the DDIC generates a row address selection signal CLK2 based on a pixel row whose content is to be updated. Logical processing is performed on CLK2 and row drive signals output by N GOA circuits, and finally a corresponding row drive signal is output for only a row whose content is to be updated.

For a CLK2-valid row, a drive selection circuit is on, that is, a corresponding row drive signal is output. For a CLK2-invalid row, a drive selection circuit is off and a corresponding row drive signal is masked. As shown in FIG. 10, an image that needs to be displayed is a heart pattern, that is, content of the third to the eighth rows needs to be updated, and other rows do not need to be updated. The drive selection circuits output only row drive signals corresponding to the third to the eighth rows.

According to the screen drive circuit provided in this embodiment, each row drive circuit of the screen includes a GOA circuit and a drive selection circuit. The drive selection circuit receives the row address selection signal CLK2 output by the DDIC, and determines, based on the row address selection signal, whether to output a write drive signal input by the input terminal. When CLK2 corresponding to a row is valid, the drive selection circuit outputs a write drive signal corresponding to the pixel row, so that displayed content of the row is refreshed. When a CLK2 signal corresponding to a row is invalid, a write drive signal corresponding to the pixel row is masked, that is, displayed content of the row is not refreshed. This solution implements a row drive signal that refreshes, based on displayed content, displayed content to be updated. In addition, a write drive signal corresponding to a row whose content is not to be updated is masked. In coordination with column address selection in the column direction, only some regions of the screen are refreshed based on displayed content. Therefore, power consumption and a delay of a screen refreshing process are reduced.

Figure 11:
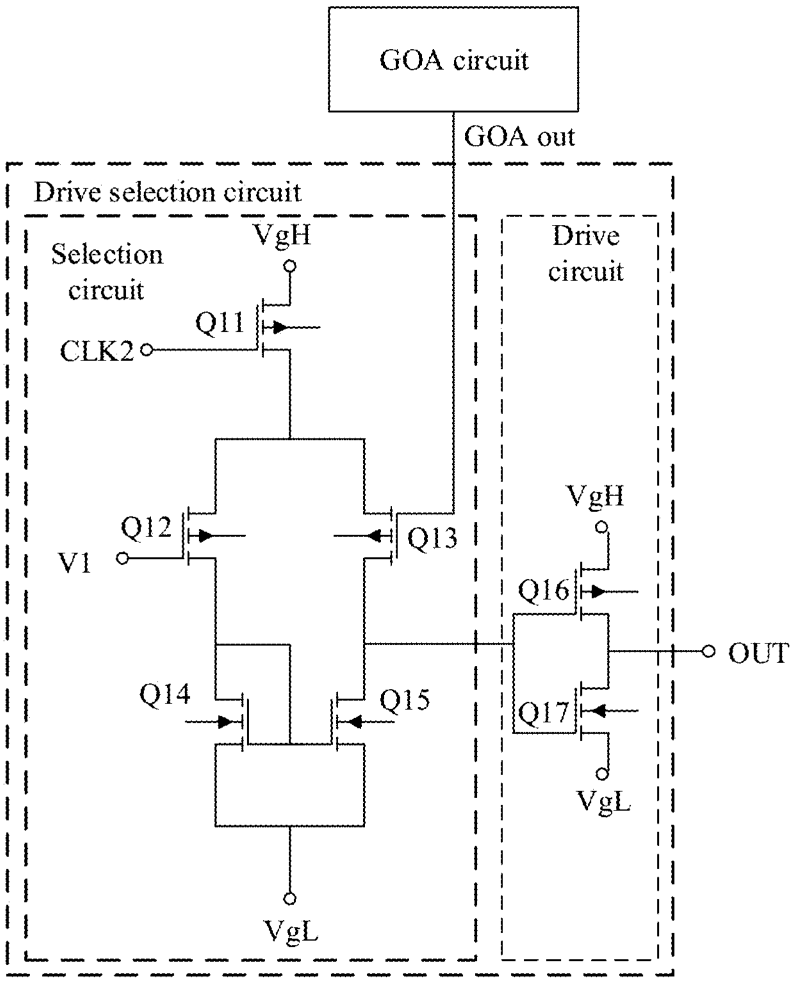
FIG. 11 is a schematic diagram of a principle of another row drive circuit according to an embodiment of this application.

FIG. 11 is a schematic diagram of a principle of another screen drive circuit according to an embodiment of this application.

As shown in FIG. 11, an output terminal of a GOA circuit is connected to an input terminal of a drive selection circuit, a control terminal of the drive selection circuit inputs the row address selection signal CLK2 output by the DDIC, and an output terminal OUT of the drive selection circuit is connected to a row of pixel circuit.

As shown in FIG. 11, the drive selection circuit includes a selection circuit and a drive circuit. The selection circuit includes switching transistors Q11~Q15, and the drive circuit includes Q16 and Q17 that are connected in series.

A gate of Q11 inputs the CLK2 signal, a first terminal of Q11 inputs the positive voltage signal VgH, a second terminal of Q11 is connected to a first terminal of Q12, a gate of Q12 inputs the first voltage signal V1, and a second terminal of Q12 is connected to a first terminal of Q14. In addition, the first terminal of Q12 is further connected to a second terminal of Q13, and a first terminal of Q13 is connected to a first terminal of Q15. A gate of Q13 is the input terminal of the drive selection circuit and is connected to the output terminal of the GOA circuit.

Second terminals of Q14 and Q15 input the negative voltage signal VgL. Gates of Q14 and Q15 are both connected to the first terminal of Q14. A common terminal of Q13 and Q15 is an output terminal of the selection circuit, and is connected to an input terminal of the drive circuit.

The input terminal of the drive circuit is gates of Q16 and Q17, a first terminal of Q16 inputs VgH, a second terminal of Q17 inputs VgL, and a drain-source common terminal of Q16 and Q17 is the output terminal OUT of the drive selection circuit.

In this embodiment, the switching transistors Q11, Q12, Q13, and Q16 are all PMOSs, which may be, for example, LTPS-PMOSs. The switching transistors Q14, Q15, and Q17 are all NMOSs, which may be, for example, IGZO-NMOSs.

Figure 12:
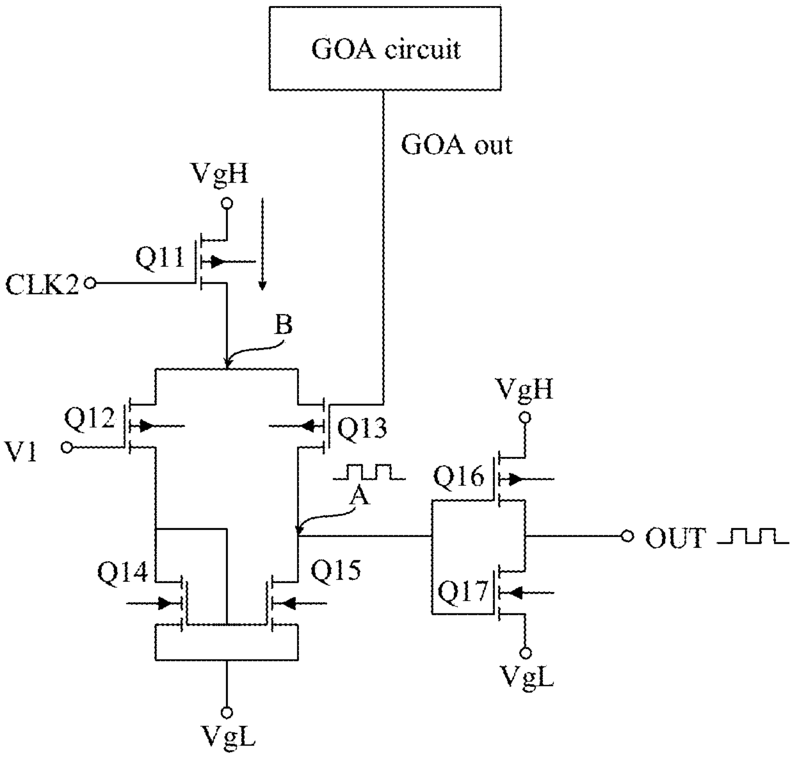
FIG. 12 is an equivalent circuit diagram of the circuit shown in FIG. 11 in a case that a row address selection signal is valid.
Figure 13:
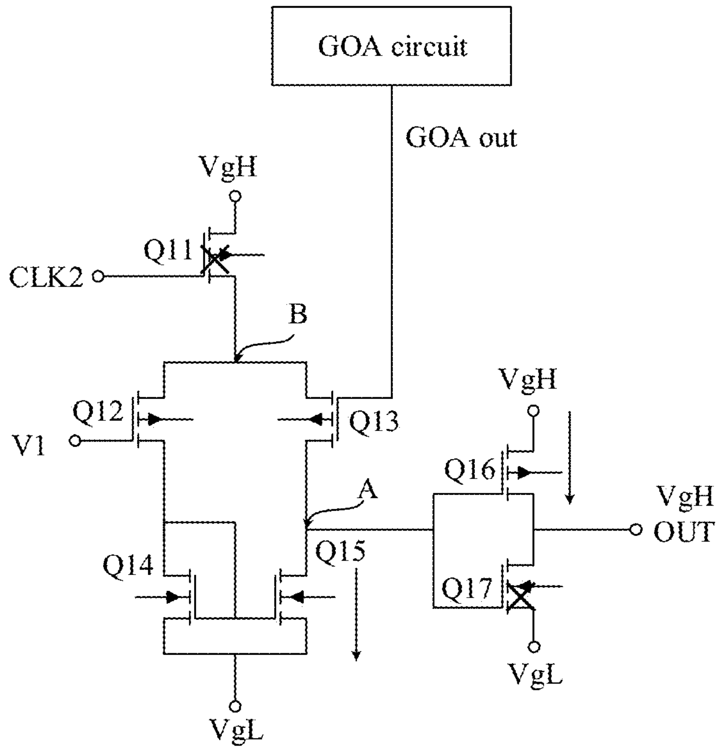
FIG. 13 is an equivalent circuit diagram of the circuit shown in FIG. 11 in a case that a row address selection signal is invalid.

The following describes in detail a working process of the drive selection circuit shown in FIG. 11 with reference to FIG. 12 and FIG. 13.

FIG. 12 is an equivalent circuit diagram of a drive selection circuit in a case that CLK2 is valid. In this embodiment, that CLK2 is valid at a low level is used as an example for description.

In this embodiment, Q14 and Q15 are in a high-resistance state, and Q13 and Q15 are equivalent to a resistor with a high resistance after being connected in series. Similarly, Q12 and Q14 are also equivalent to a resistor with a high resistance.

As shown in FIG. 12, when CLK2 has a low level, Q11 is on, and VgH is transmitted to point B by using Q11. In this case, a voltage difference between Q13 and Q15 is close to VgH-VgL. When the gate of Q13 inputs a pulse signal, a pulse signal at a same frequency is differentially output from point A and is input to the drive circuit. The pulse signal is enhanced by the drive circuit through driving, and then is output by the output terminal OUT, that is, the output terminal OUT outputs a pulse signal that has a same frequency as the pulse signal at point A and that has a driving capability, that is, a write drive signal. It can be learned that when CLK2 is valid, the output terminal OUT outputs the write drive signal output by the GOA circuit.

FIG. 13 is a schematic equivalent circuit diagram of a drive selection circuit in a case that CLK2 is invalid. CLK2 is invalid at a high level.

As shown in FIG. 13, when CLK2 has a high level, Q11 is off, and a voltage at point B is Floating (drifting). In this case, a voltage difference of Q11 is close to VgH-VgL, and a voltage at point A is pulled down, that is, the input terminal of the drive circuit is at a low level. In this case, Q16 is on, and the output terminal OUT outputs VgH, that is, a write invalid signal.

It can be learned that a diagram of signal waveforms of key nodes corresponding to the drive selection circuit shown in FIG. 11 is the same as that shown in FIG. 6, and details are not described herein again.

In another embodiment of this application, the switching transistor Q11 may alternatively be an NMOS. In this case, CLK2 is valid at a high level and invalid at a low level, and details are not described herein again.

Figure 14:
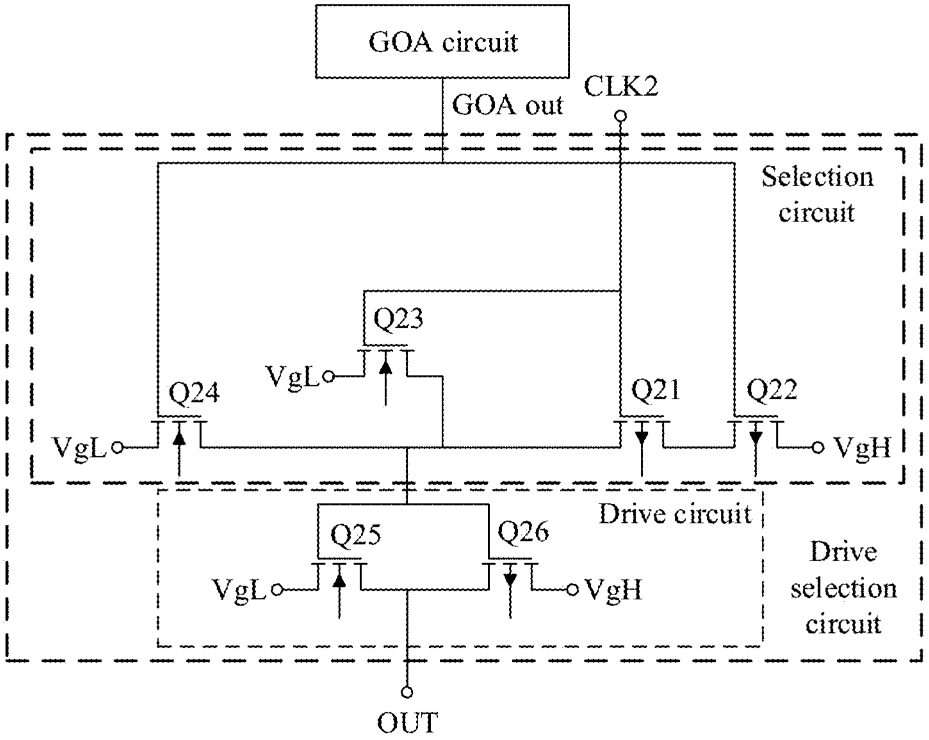
FIG. 14 is a schematic diagram of a principle of still another row drive circuit according to an embodiment of this application.

FIG. 14 is a schematic diagram of a principle of another screen drive circuit according to an embodiment of this application.

As shown in FIG. 14, a drive selection circuit includes a selection circuit and a drive circuit. The selection circuit includes switching transistors Q21~Q24, and the drive circuit includes switching transistors Q25 and Q26.

A gate of Q21 inputs the row address selection signal CLK2, Q21 and Q22 are connected in series, a gate of Q22 is connected to an output terminal of a GOA circuit, a first terminal of Q22 inputs the positive voltage signal VgH, a second terminal of Q22 is connected to a first terminal of Q21, and the first terminal of Q21 is connected to an input terminal of the drive circuit.

A gate of Q23 inputs the row address selection signal CLK2, a first terminal of Q23 is connected to the input terminal of the drive circuit, and a second terminal of Q23 inputs the negative voltage signal VgL.

A gate of Q24 is connected to the output terminal of the GOA circuit, a first terminal of Q24 is connected to the input terminal of the drive circuit, and a second terminal of Q24 inputs the negative voltage signal VgL.

The drive circuit includes Q25 and Q26 that are connected in series, gates of Q25 and Q26 are the input terminal of the drive circuit, a first terminal of Q25 is connected to a second terminal of Q26, a second terminal of Q25 inputs VgL, and a first terminal of Q26 inputs VgH. A drain-source common terminal of Q25 and Q26 is an output terminal OUT of the drive selection circuit.

In this embodiment, the switching transistors Q23, Q24, and Q25 are all NMOSs, which may be specifically IGZO-NMOSs. The switching transistors Q21, Q22, and Q26 are all PMOSs, which may be specifically LTPS-PMOSs.

This application sets no limitation on a type of each switching transistor in the drive selection circuit. For example, Q23 may alternatively be a PMOS transistor, and another switching transistor may correspondingly be a semiconductor transistor of a corresponding type. This application sets no limitation thereto.

Figure 15:
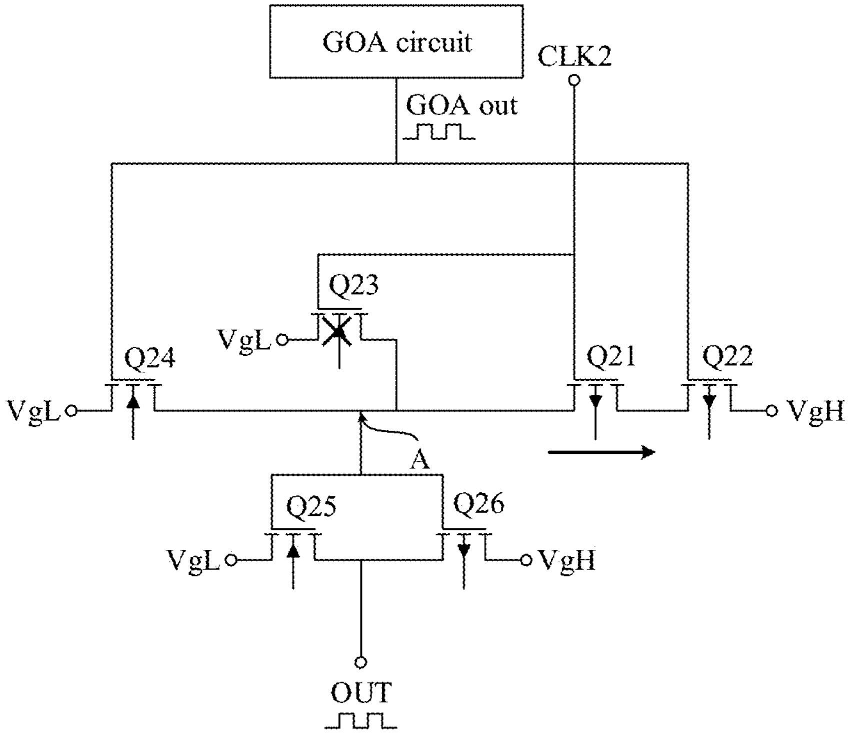
FIG. 15 is an equivalent circuit diagram of the circuit shown in FIG. 14 in a case that a row address selection signal is valid.
Figure 16:
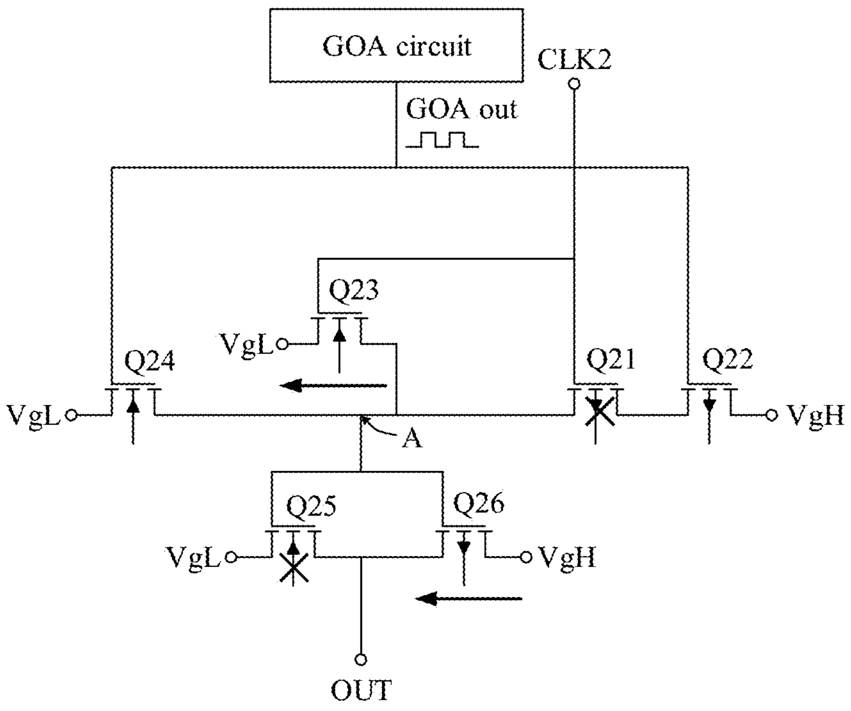
FIG. 16 is an equivalent circuit diagram of the circuit shown in FIG. 14 in a case that a row address selection signal is invalid.

The following describes in detail a working process of the drive selection circuit shown in FIG. 14 with reference to FIG. 15 and FIG. 16.

FIG. 15 is an equivalent circuit diagram of a principle of a drive selection circuit in a case that CLK2 is valid. In this embodiment, that CLK2 is valid at a low level is used as an example for description.

As shown in FIG. 15, when CLK2 has a low level, Q21 is on and Q23 is off. An output signal GOA out of a GOA circuit is a pulse signal.

For a high-level period of the GOA out pulse signal, Q24 is on, and a voltage at point A (an input terminal of a drive circuit) is pulled down to VgL. Q25 is off, Q26 is on, and an output terminal OUT outputs the positive voltage signal VgH.

For a low-level period of the GOA out pulse signal, Q24 is off and Q22 is on. Because Q21 is also in the on state, VgH is transmitted to point A by using Q21 and Q22. In this case, Q25 is on, Q26 is off, and an output signal of the output terminal OUT is the negative voltage signal VgL.

It can be learned that when CLK2 has a low level, the output terminal OUT outputs the pulse signals that alternately change between VGL and VgH. In other words, when CLK2 is valid, the drive selection circuit is on and outputs a write drive signal output by the connected GOA circuit.

As shown in FIG. 16, when CLK2 has a high level, Q21 is off, Q23 is on, and VgL is transmitted to point A by using Q23. In this case, Q25 is off, Q26 is on, and an output signal of the output terminal OUT is the positive voltage signal VgH. It can be learned that when CLK2 is invalid, the drive selection circuit masks the write drive signal output by the GOA circuit, that is, the signal output by the output terminal OUT is invalid.

Because CLK2 is invalid for a relatively long time, that is, Q23 is in a forward bias state for a long time, this may cause damage to Q23 due to the long-time forward bias, and consequently, the selection circuit cannot output the positive voltage signal VgH. To further resolve the problem, this application further provides another screen drive circuit.

Figure 17:
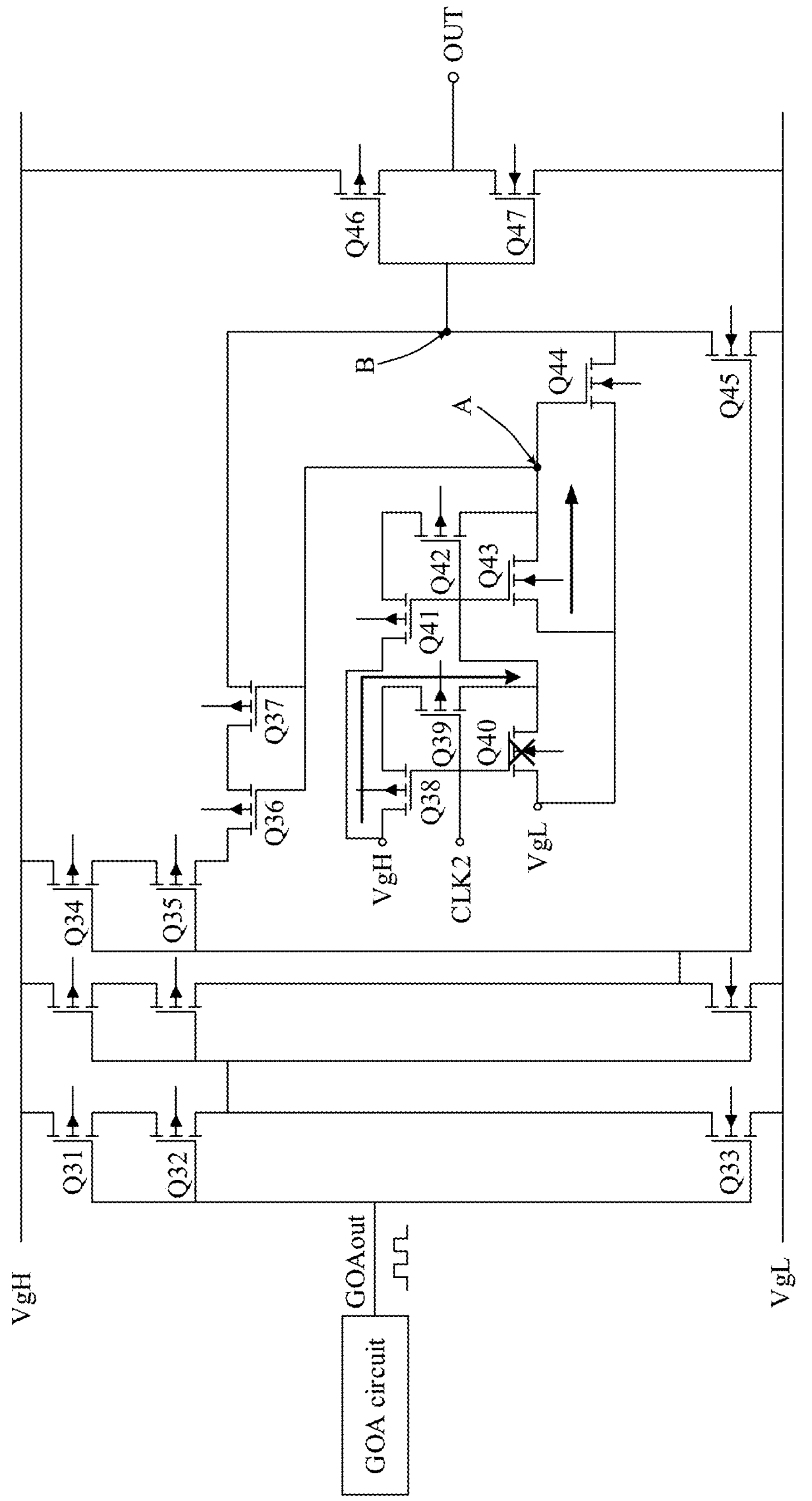
FIG. 17 is an equivalent circuit diagram of yet another row drive circuit in a case that a row address selection signal is valid according to an embodiment of this application.

As shown in FIG. 17, a drive selection circuit includes switching transistors Q31~Q45, and a drive circuit includes Q46 and Q47 that are connected in series (that is, a CMOS inverter).

As shown in FIG. 17, gates of Q31, Q32, and Q33 are connected to an output terminal of a GOA circuit, and sources and drains of Q31, Q32, and Q33 are sequentially connected in series to form a first series branch (that is, a CMOS inverter). A first terminal (the drain) of Q31 inputs the positive voltage signal VgH, and the source of Q33 inputs the negative voltage signal VgL.

A structure of a second series branch is similar to a structure of the first series branch, and is also a CMOS inverter. Details are not described herein again.

A common terminal of Q32 and Q33 (that is, an output terminal of the CMOS inverter) is connected to an input terminal of the second series branch (that is, an input terminal of the CMOS inverter).

An output terminal of the second series branch (that is, an output terminal of the CMOS inverter) is connected to an input terminal of a third series branch. The third series branch includes switching transistors Q34 and Q35 whose sources and drains are sequentially connected in series. The input terminal of the third series branch is gates of Q34 and Q35, and an output terminal of the third series branch is a second terminal (the source) of Q35. A second terminal (the source) of Q34 is connected to a first terminal (the drain) of Q35, a first terminal of Q34 inputs the positive voltage signal VgH, and the output terminal of the third series branch is connected to an input terminal (that is, node B) of a fourth series branch.

The fourth series branch includes Q36 and Q37 whose sources and drains are sequentially connected in series, the input terminal of the fourth series branch is a first terminal (the drain) of Q36, a second terminal of Q36 is connected to a first terminal of Q37, and a second terminal of Q37 is connected to an input terminal of the drive circuit. Gates of Q36 and Q37 are connected to node A.

A first terminal of Q45 is connected to node B, a second terminal of Q45 inputs VgL, and a gate of Q45 is connected to the output terminal of the second series branch.

Sources and drains of Q38~Q40 are sequentially connected in series to form a fifth series branch (that is, a CMOS inverter), gates of Q38~Q40 are all connected to CLK2, a first terminal (the drain) of Q38 inputs VgH, and a second terminal (the source) of Q40 is connected with inputs VgL.

Sources and drains of Q41~Q43 are sequentially connected in series to form a sixth series branch (that is, a CMOS inverter), gates of Q41~Q43 are connected to a common terminal of Q39 and Q40, a first terminal (the drain) of Q41 inputs VgH, and a second terminal of Q43 inputs VgL.

A gate of the switching transistor Q44 is connected to a common terminal (that is, node A) of Q42 and Q43, a first terminal of Q44 is connected to node B, and a second terminal (a source) of Q44 inputs VgL.

The drive circuit includes Q46 and Q47 whose sources and drains are sequentially connected in series, a first terminal of Q46 inputs VgH, and a second terminal of Q47 inputs VgL. That is, Q46 and Q47 form a CMOS inverter. A drain-source common terminal of Q46 and Q47 is an output terminal OUT of the drive selection circuit.

It should be noted that, in the drive selection circuit shown in FIG. 17, switching transistors of a same type that are connected in series/connected in parallel over a common gate may be equivalent to one switching transistor, for example, Q31 and Q32 may be equivalent to one switching transistor.

In this embodiment, as shown in FIG. 17, the switching transistors Q31~Q39, Q41, Q42, and Q46 may all be PMOSs, which may be specifically LTPS-PMOSs. The remaining switching transistors, such as Q33, Q40, Q43~Q45, and Q47, may all be NMOSs, which may be specifically IGZO-NMOSs.

This application sets no limitation on a type of each switching transistor in the drive selection circuit. For example, Q31 may alternatively be an NMOS transistor, and another switching transistor in a corresponding circuit may be a semiconductor transistor of a corresponding type. This application sets no limitation thereto.

In addition, to improve drive timeliness of the drive circuit, Q46 and Q47 may be separately a switching transistor group obtained by connecting a plurality of switching transistors of a same type in parallel, and this application sets no limitation thereto.

As shown in FIG. 17, when CLK2 is valid (for example, CLK2 is a low-level signal), Q38 and Q39 are on, Q40 is off, VgH is transmitted to the gates of Q41~Q43, Q41 and Q42 are off, Q43 is on, and a voltage at node A is pulled down to VgL, that is, a gate voltage of Q44 is pulled down to VgL. In this case, Q44 is off. In addition, forward bias at Q44 is avoided.

In addition, a voltage at point A is pulled down to VgL, and therefore Q36 and Q37 are always in the on state.

An output terminal GOA out of the GOA circuit outputs a write drive signal (that is, a pulse signal). For a high-level period of the pulse signal, Q33 is on, and Q31 and Q32 are off, to transmit the negative voltage signal VgL to a gate of the second series branch, so that a PMOS transistor in the second series branch is on. In this way, the positive voltage signal VgH is transmitted to node C, that is, gate voltages of Q34, Q35, and Q45 are VgH, Q34 and Q35 are off, and Q45 is on, so that VgL is transmitted to node B. In this case, Q46 is on, Q47 is off, and VgH is transmitted to the output terminal OUT by using Q46. In other words, when the GOA circuit outputs a high-level pulse signal, an output signal of the output terminal OUT is VgH.

For a low-level period of the pulse signal output by GOA out, Q31 and Q32 are on, VgH is transmitted to the second series branch, an NMOS transistor in the second series branch is on, and VgL is transmitted to node C by using the NMOS transistor, so that Q34 and Q35 are on. Because when CLK2 has a low level, Q36 and Q37 are always in the on state, and VgH is transmitted to node B by using Q34~Q37, so that Q47 is on, and VgL is transmitted to the output terminal OUT by using Q47. That is, when the GOA circuit outputs a low-level pulse signal, an output signal of the output terminal OUT is VgL.

In conclusion, it can be learned that, when CLK2 has a low level, the output terminal OUT outputs write drive signals that alternate between VgL and VgH.

Figure 18:
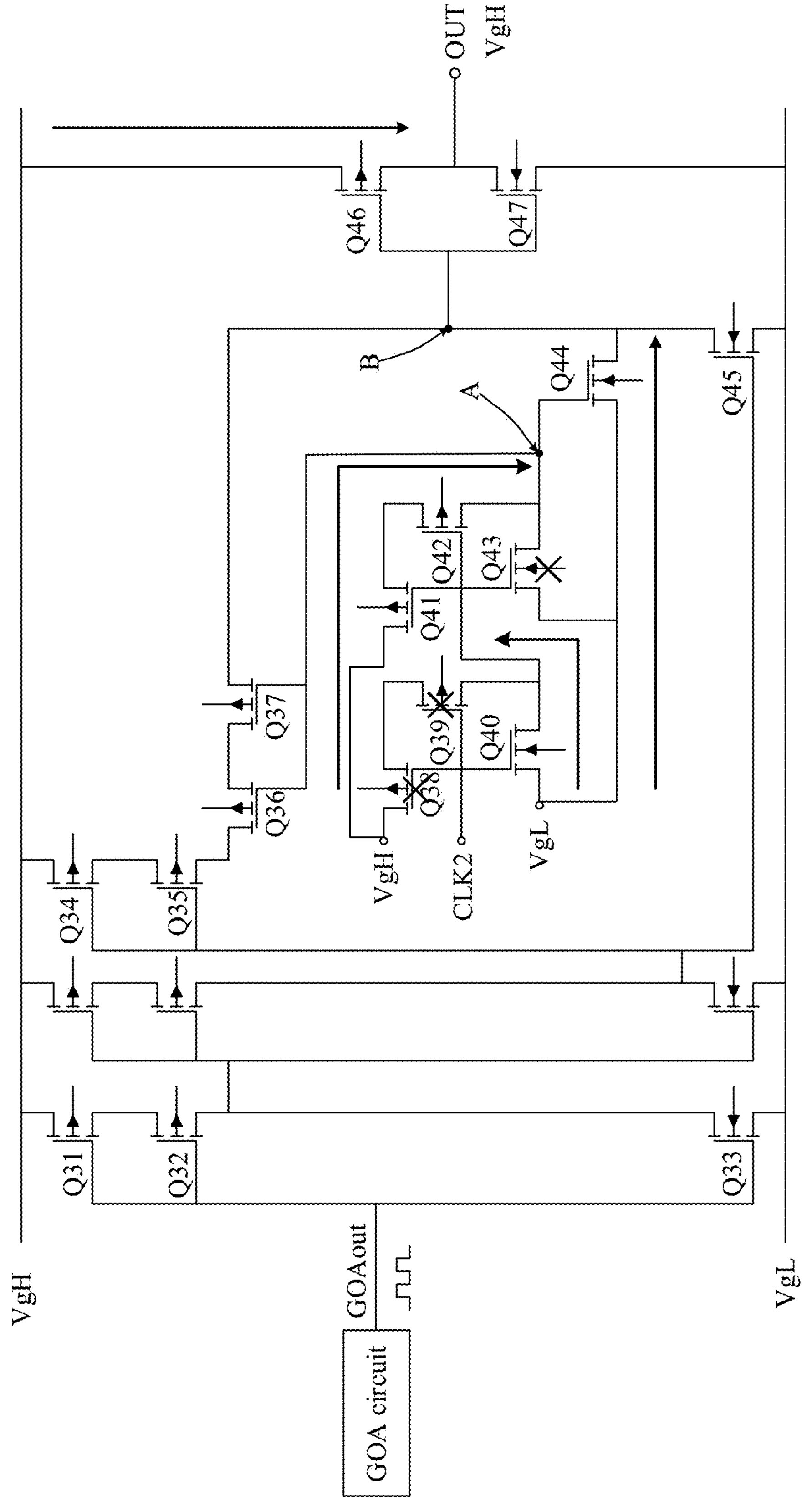
FIG. 18 is an equivalent circuit diagram of yet another row drive circuit in a case that a row address selection signal is invalid according to an embodiment of this application.

FIG. 18 is a schematic equivalent circuit diagram of a drive selection circuit in a case that CLK2 is invalid. For example, CLK2 is invalid at a high level.

As shown in FIG. 18, when CLK2 has a high level, Q38 and Q39 are off, Q40 is on, and VgL is transmitted to the gates of Q41~Q43. In this case, Q41 and Q42 are on, and Q43 is off, so that VgH is transmitted to node A. In this case, Q44 is on, so that VgL is transmitted to node B, and therefore Q46 is on, and further VgH is transmitted to the output terminal OUT by using Q46. That is, when CLK2 has a high level, the output terminal OUT outputs the positive voltage signal VgH.

According to the screen drive circuit provided in this embodiment, when CLK2 is valid, the gate voltage of Q44 is pulled up to serve as a positive voltage signal. Therefore, Q44 is avoided from a failure caused by its long stay in the forward bias state, thereby improving reliability of the drive selection circuit, and finally improving stability and reliability of the entire screen drive circuit.

Figure 19:
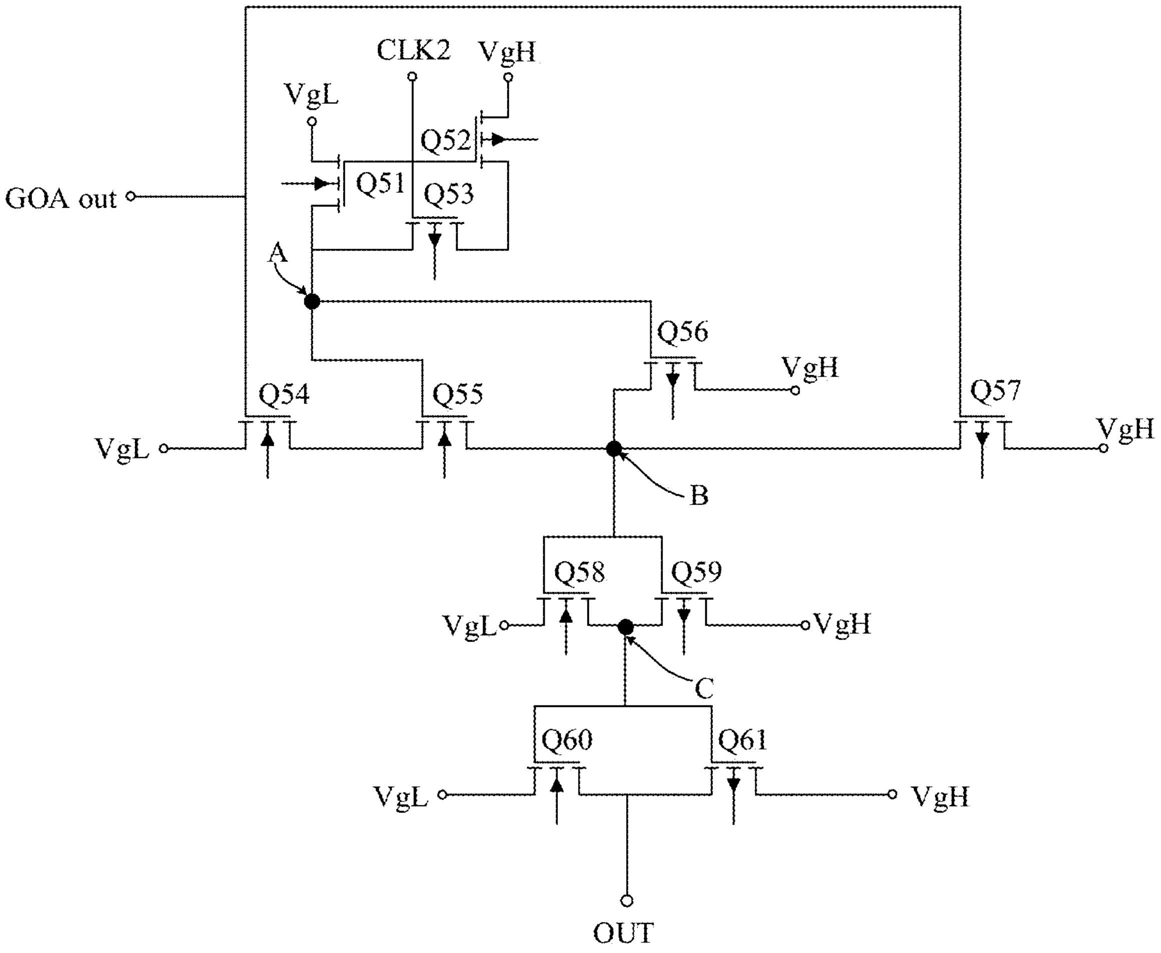
FIG. 19 is a diagram of a circuit principle of another drive selection circuit according to an embodiment of this application.

As described above, in the embodiment shown in FIG. 15, Q23 may further be replaced with a PMOS transistor. A type of another switching transistor in the corresponding drive selection circuit needs to be adaptively adjusted. FIG. 19 shows a drive selection circuit obtained after replacement of the PMOS transistor.

FIG. 19 is a schematic diagram of a principle of another drive selection circuit according to an embodiment of this application.

As shown in FIG. 19, when CLK2 is valid (for example, CLK2 has a low level), Q51 is off, Q52 and Q53 are on, and a potential at point A is pulled up to near VgH. Therefore, Q55 is on.

Q54 is an NMOS transistor. At a high level of a pulse signal output by GOA out, Q54 is on. Because Q55 is also on, a potential at point B is pulled down to near VgL. In this case, Q59 is on, a potential at point Cis pulled up to near VgH. Because Q60 is an NMOS transistor, Q60 is on, and the output terminal OUT outputs VgH.

Q57 is a PMOS transistor. At a low level of the pulse signal output by GOA out, Q57 is on, that is, a potential at point B is pulled up to near VgH, so that Q58 is on. Therefore, a potential at point C is pulled down, and further Q61 is on, and the output terminal OUT outputs VgL.

In conclusion, it can be learned that, when CLK2 is valid, the output terminal OUT outputs a pulse signal that has a same phase and a same frequency as the pulse signal output by GOA out, that is, when CLK2 is valid, the output terminal OUT outputs a write drive signal.

When CLK2 is invalid (for example, CLK2 has a high level), Q51 is on, Q52 and Q53 are off, and a potential at point A is pulled down to near VgL. Therefore, Q56 is on, and a potential at point B is pulled up to near VgH. In this case, Q58 is on, and a potential at point Cis pulled down to near VgL, so that Q61 is on, and finally the output terminal OUT outputs VgH, that is, a write invalid signal.

In this embodiment, in this scenario, Q56 may be damaged due to its long stay in a reverse bias state, and consequently the drive selection circuit cannot output a low-level signal in the end.

In another embodiment, to avoid a reverse bias of the switching transistor Q56 in the foregoing scenario, an embodiment of this application further provides still another screen drive circuit.

Figure 20:
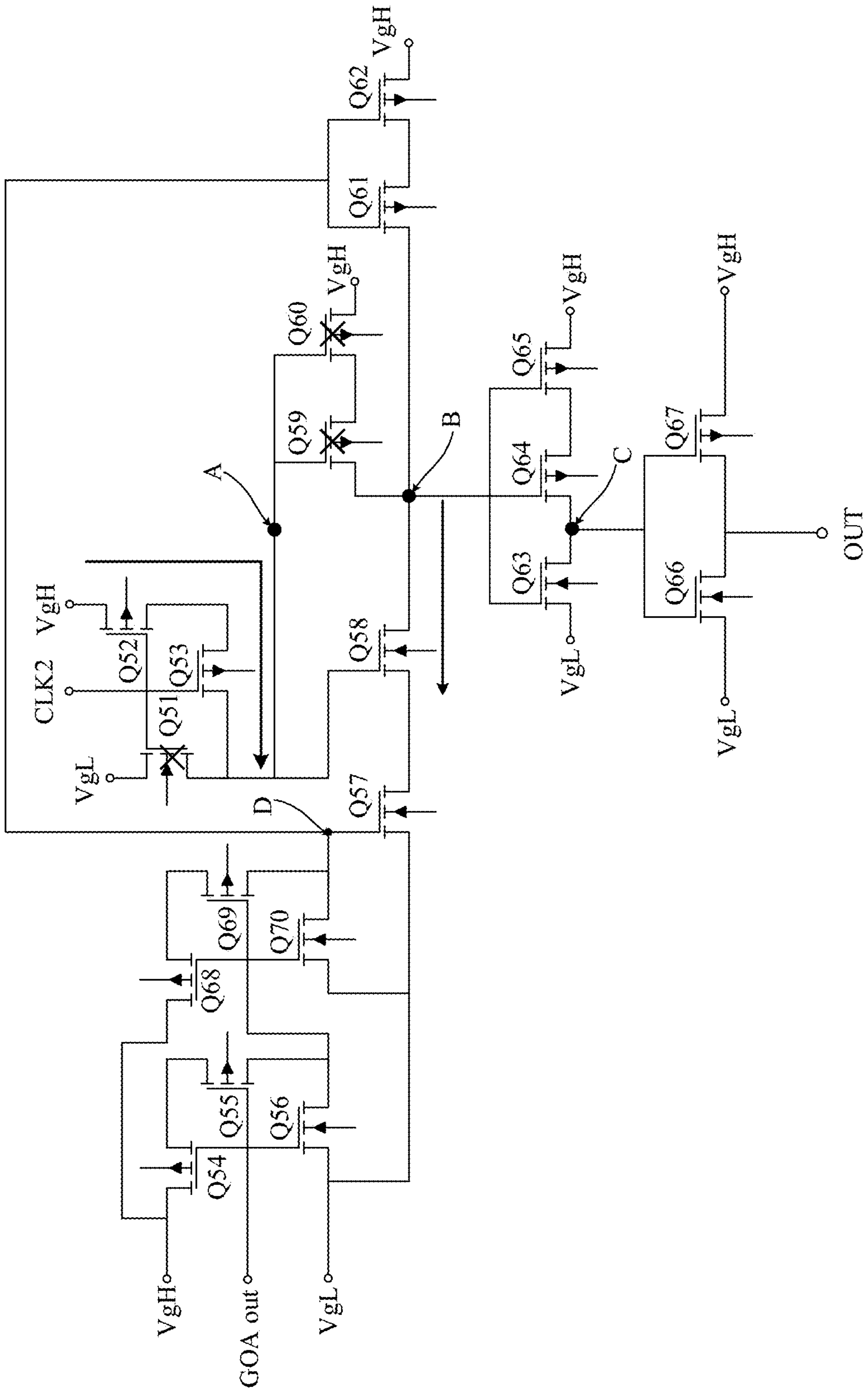
FIG. 20 is an equivalent circuit diagram of still another row drive circuit in a case that a row address selection signal is valid according to an embodiment of this application.

As shown in FIG. 20, a selection circuit includes switching transistors Q51~Q65, and a drive circuit includes Q66 and Q67.

Q51~Q53 are connected in series over a common gate to obtain a first series branch (Q52 and Q53 may be equivalent to one switching transistor). One terminal of the first series branch (that is, a second terminal of Q51) inputs the negative voltage signal VgL, and the other terminal (that is, a first terminal of Q52) inputs the positive voltage signal VgH. Gates of Q51~Q53 are connected to an output terminal of a GOA circuit. That is, Q51~Q53 form a CMOS inverter. An input terminal of the CMOS inverter inputs CLK2, and an output terminal of the CMOS inverter is connected to node A.

Q54~Q56 are connected in series over a common gate to obtain a second series branch. Similarly, Q54 and Q55 may be equivalent to one switching transistor.

One terminal (a first terminal of Q54) of the second series branch inputs VgH, and the other terminal (a second terminal of Q56) of the second series branch inputs VgL. Gates of Q54~Q56 are connected to the output terminal of the GOA circuit. Similar to Q51~Q53, Q54~Q56 form a CMOS inverter. An input terminal of the CMOS inverter inputs a GOA out signal, and an output terminal of the CMOS inverter is connected to an input terminal of a CMOS inverter formed by Q68~Q70.

A drain-source common terminal (node D, that is, an output terminal of the CMOS inverter) of Q69 and Q70 is connected to a third series branch. Q68 and Q69 may be equivalent to one switching transistor.

The third series branch includes two switching transistors Q57 and Q58 that are connected in series. A second terminal of Q57 inputs VgL, a first terminal of Q58 is connected to one terminal (node B) of a fourth series branch, a gate of Q57 is connected to node B, and a gate of Q58 is connected to a common terminal (node A) of Q51 in the first series branch and Q59.

The fourth series branch includes two switching transistors Q59 and Q60 that are connected in series over a common gate. A second terminal of Q59 is node B, a first terminal of Q60 inputs VgH, and gates of Q59 and Q60 are connected to node A. Q59 and Q60 are semiconductor transistors of a same type, and are connected in series over a common gate. Therefore, Q59 and Q60 may be equivalent to one switching transistor, that is, Q56 in FIG. 19.

A fifth series branch includes two switching transistors Q61 and Q62 that are connected in series over a common gate. A second terminal of Q61 is connected to node B, and a first terminal of Q62 inputs VgH, and gates of Q61 and Q62 are connected to the gate of Q57, that is, node D. Q61 and Q62 may be equivalent to one switching transistor.

A sixth series branch includes three switching transistors Q63~Q65 that are connected in series over a common gate. Q64 and Q65 are semiconductor transistors of a same type, which is different from a type of Q63. For example, if Q63 is an NMOS, Q64 and Q65 are PMOSs. A second terminal of Q63 inputs VgL, a first terminal of Q65 inputs VgH, gates of Q63~Q65 are connected to node B, and a drain-source common terminal of Q63 and Q64 is connected to an input terminal of the drive circuit, that is, node C. Q64 and Q65 may be equivalent to one switching transistor. It can be learned that, Q63~Q65 form a CMOS inverter.

The drive circuit includes switching transistors Q66 and Q67 that are connected in series over a common gate. Types of Q66 and Q67 are different. For example, if Q66 is an NMOS, Q67 is a PMOS. A second terminal of Q66 inputs VgL, and a first terminal of Q67 inputs VgH. A drain-source common terminal of Q66 and Q67 is an output terminal OUT of a drive selection circuit.

FIG. 20 is an equivalent circuit diagram of a drive selection circuit in a case that CLK2 is valid. That CLK2 is valid at a low level is used as an example for description.

As shown in FIG. 20, when CLK2 has a low level, Q51 is off, Q52 and Q53 are on, and VgH is transmitted to point A. Consequently, Q59 and Q60 are off, and Q58 is on. In addition, when CLK2 is valid, gate voltages of Q56 and Q60 are pulled up to the positive voltage signal VgH, thereby avoiding Q59 and Q60 from failures caused by long stays of Q59 and Q60 in the reverse bias state.

A GOAout signal output by the GOA circuit is a write drive signal (that is, a pulse signal). In a period in which GOA out has a high level, Q56 is on, and VgL is transmitted to gates of Q68~Q70. As a result, Q68 and Q69 are on, so that VgH is transmitted to point D, and further Q57 is on. In this way, VgL is transmitted to the source of Q58 by using Q57, and a gate voltage of Q58 is VgH. Therefore, Q58 is on, and VgH is transmitted to node B by using Q58. Further, Q63 is on, so that VgL is transmitted to node C by using Q63. In this way, Q67 is on, and finally VgH is transmitted to the output terminal OUT by using Q67. That is, when CLK2 has a low level, GOAout is in a high-level period, and OUT also outputs a high-level signal.

In a period in which GOAout has a low level, Q54 and Q55 are on, so that VgH is transmitted to the gates of Q68~Q70. As a result, Q70 is on, and VgL is further transmitted to node D by using Q70. In this way, gate voltages of Q61 and Q62 are VgL, and therefore Q61 and Q62 are on, so that VgH is transmitted to node B by using Q61 and Q62. Therefore, Q63 is on, so that VgL is transmitted to node C by using Q63, and finally Q67 is on and the output terminal OUT outputs VgH. In can be learned that, when CLK2 is in a low-level period, GOAout is in a low-level period, and OUT also outputs a low-level signal.

In conclusion, when CLK2 is valid, the output terminal OUT of the drive selection circuit outputs write drive signals that alternate between VgL and VgH.

Figure 21:
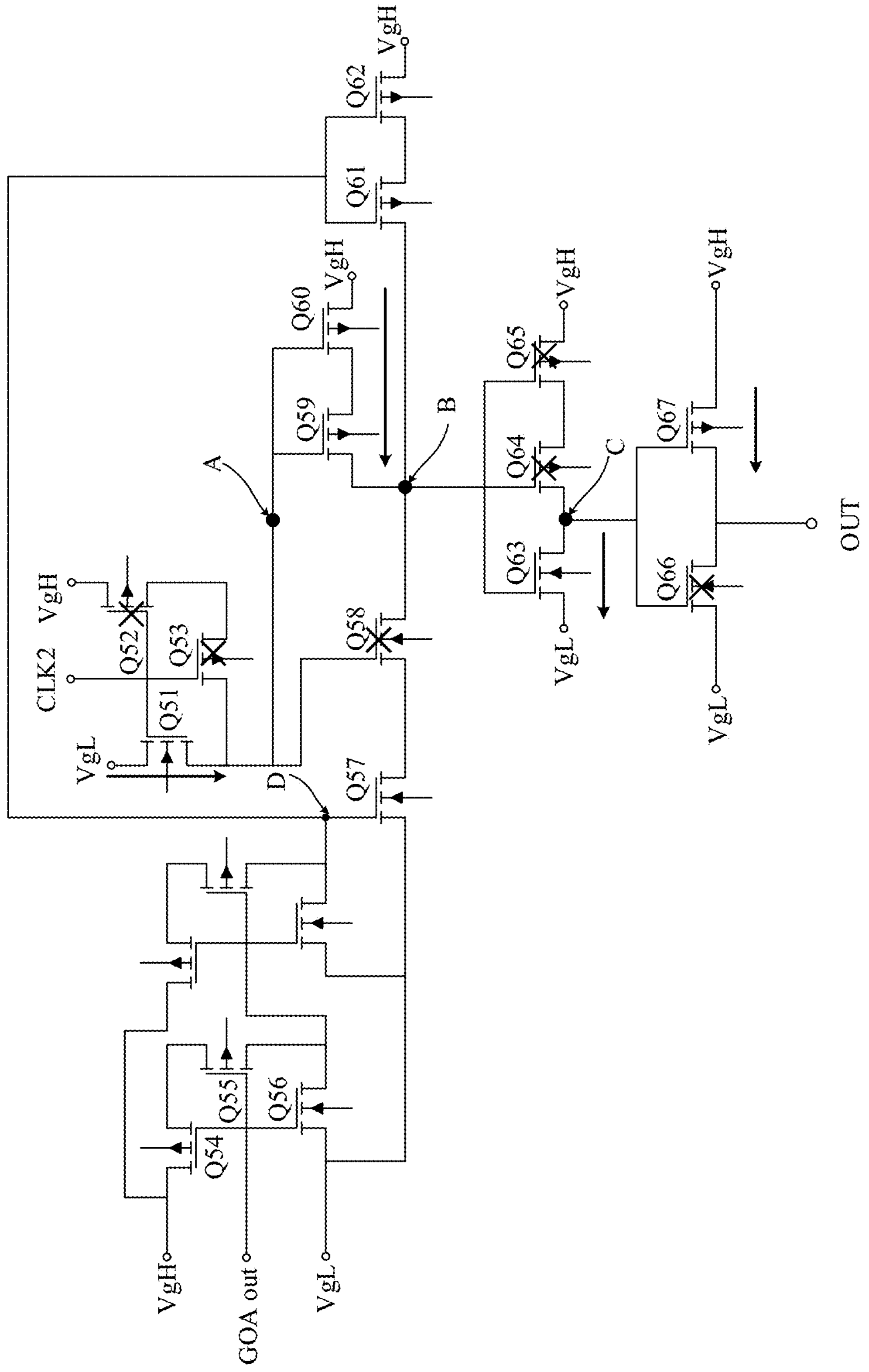
FIG. 21 is an equivalent circuit diagram of yet another row drive circuit in a case that a row address selection signal is valid according to an embodiment of this application.

FIG. 21 is an equivalent circuit diagram of a drive selection circuit in a case that CLK2 is invalid. That CLK2 is invalid at a high level is used as an example for description.

As shown in FIG. 21, when CLK2 has a high level, Q52 and Q53 are off, Q51 is on, and VgL is transmitted to node A by using Q51, that is, gate voltages of Q59 and Q60 are VgL. Therefore, Q59 and Q60 are on, so that VgH is transmitted to node B by using Q59 and Q60, that is, a gate voltage of Q63 is VgH. Therefore, Q63 is on, Q64 and Q65 are off, and VgL is transmitted to node C by using Q63, that is, a gate voltage of Q67 is VgL. Therefore, Q67 is on, so that VgH is transmitted to the output terminal OUT by using Q67. That is, when CLK2 is invalid, the output terminal OUT outputs the high-level signal VgH, that is, does not output a write drive signal.

The screen drive circuit provided in this embodiment is connected to the first series branch in a series branch of Q59 and Q60. When CLK2 is valid, the gate voltages of Q59 and Q60 are pulled up to the positive voltage signal VgH. Therefore, Q59 and Q60 are avoided from failures caused by their long stays in the reverse bias state, thereby improving reliability of the screen drive circuit.

It should be noted that, in this application, any switching transistor in the drive circuit of the drive selection circuit may be replaced with a plurality of switching transistors of a same type that are connected in parallel, thereby improving timeliness of the drive circuit.

In another aspect, this application further provides an AMOLED display. A structure of the AMOLED display is shown in FIG. 1, and details are not described herein again.

A row drive circuit in the AMOLED provided in this embodiment may use the drive selection circuit provided in any embodiment. That is, the AMOLED can selectively drive some pixel rows in a pixel array based on update of displayed content, in other words, an effective display region of the display can be divided into at least two different working partitions. The row drive circuit and a column drive circuit coordinate with the DDIC to identify displayed data to be updated (that is, Δdata), so as to determine pixels included in different working partitions.

Each work partition can separately refresh displayed content, for example, refresh the displayed content at a different refresh rate. For example, the drive selection circuit may select a plurality of working partitions with different refresh rates on the display, for example, a base frequency region, a first frequency multiplication region, a second frequency multiplication region, and the like. For example, a refresh rate of the base frequency region is kept at a lowest frequency for maintaining display, for example, 0.5 Hz. A refresh rate of the first frequency multiplication region is slightly higher than that of the base frequency region, and may be used to display content with a relatively high refresh requirement, such as a chat window, a static background, or the like. For example, the refresh rate may be 30 Hz. The second frequency multiplication region displays content with a higher refresh requirement, such as a message pop-up window or a quick preview window. For example, a refresh rate may be 60 Hz, 90 Hz, or even 120 Hz.

Figure 22:
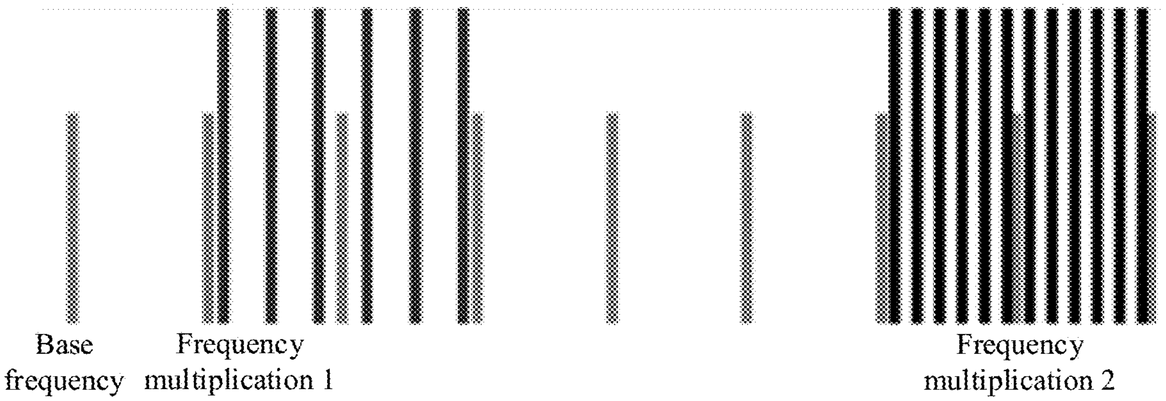
FIG. 22 is a schematic diagram of a comparison among refresh rates of working partitions on a display according to an embodiment of this application.

FIG. 22 is a schematic diagram of a comparison among refresh rates of a base frequency region and frequency multiplication regions. As shown in FIG. 22, a frequency of frequency multiplication region 1 is greater than a frequency of a base frequency region and is less than a frequency of frequency multiplication region 2. In addition, after the base frequency acts on the effective display region of the entire display, that is, after the effective display region is divided into a plurality of working partitions with different refresh rates, each partition may be refreshed based on a refresh rate corresponding to its respective partition, and may also be refreshed based on the refresh rate corresponding to the base frequency.

In addition, the working partitions are dynamically adjusted based on change data (Δdata) of the displayed content, that is, locations of the working partitions on the display are unfixed. In addition, an operation unit of a row drive circuit in each working partition may be a single sub-pixel (for example, for an R-type OLED, a G-type OLED, or a B-type OLED), or may be a quasi-pixel (for example, for an RB-type OLED) formed by a plurality of sub-pixels.

Figure 23:
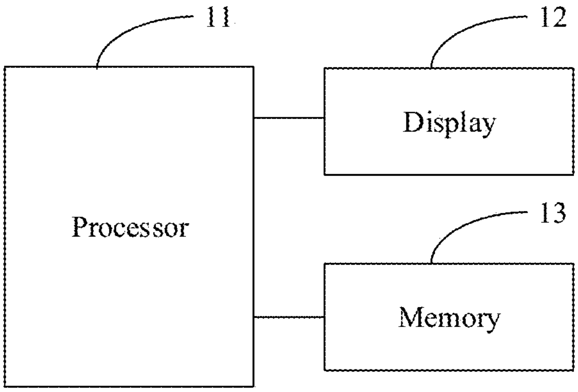
FIG. 23 is a schematic diagram of a structure of an electronic device according to an embodiment of this application.

In still another aspect, an embodiment of this application further provides an electronic device. As shown in FIG. 23, the electronic device may include a processor 11, a display 12, and a memory 13.

It may be understood that the structure shown in this embodiment does not specifically limit the electronic device. In some other embodiments, the electronic device may include more or fewer components than those shown in the figure, or combine some components, or split some components, or have different component arrangements. The foregoing components may be implemented by using hardware, software, or a combination of software and hardware.

The memory 13 may be configured to store computer-executable program code, and the executable program code includes instructions.

The processor 11 invokes and runs the instructions stored in the memory 13, so that the electronic device executes various function applications and data processing.

The display 12 is configured to display images, videos, and the like. The display 12 includes a display panel. The display panel may use the AMOLED provided in embodiments of this application, or certainly may use another type of display panel. This is not limited in this application.

In some embodiments, the electronic device may include one or N displays 12, where N is a positive integer greater than 1.

Through the descriptions of the foregoing implementations, a person skilled in the art may clearly understand that, for ease and brevity of description, only division of the foregoing functional modules is used as an example for description. In actual application, the functions may be allocated to and completed by different functional modules based on a requirement. In other words, an internal structure of the apparatus is divided into different functional modules, to complete all or some of the functions described above. For specific working processes of the system, apparatus, and unit described above, refer to corresponding processes in the foregoing method embodiments. Details are not described herein again.

In the several embodiments provided in the embodiments, it should be understood that the disclosed system, apparatus, and method may be implemented in other manners. For example, the described apparatus embodiment is merely an example. For example, the module or unit division is merely logical function division, and there may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate components may or may not be physically separated, and components displayed as units may or may not be physical units, in other words, may be located in one place, or may be distributed on a plurality of network units. Some or all of the units may be selected based on actual requirements to achieve the objectives of the solutions in embodiments.

In addition, functional units in the embodiments may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of the embodiments essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments. The foregoing storage medium includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any change or replacement made within the technical scope disclosed in this application shall fall within the protection scope of this application. Therefore, the protection scope of this application shall be subject to the protection scope of the claims.

The invention claimed is:

1. A screen drive circuit, applied to a display and comprising an array drive circuit and a drive selection circuit, wherein the array drive circuit comprises a row drive circuit and a column drive circuit;

the row drive circuit generates a row drive signal that is used to drive a pixel row in the display; and an input terminal of the drive selection circuit is connected to an output terminal of the row drive circuit, a control terminal of the drive selection circuit receives a row address selection signal and outputs, based on the row address selection signal, the row drive signal corresponding to a pixel row whose displayed content changes, and the row address selection signal is generated, by a display drive chip connected to the display, based on the pixel row whose displayed content changes;

wherein the drive selection circuit comprises a selection circuit and a drive circuit;

wherein an input terminal of the selection circuit is connected to the output terminal of the row drive circuit, a control terminal of the selection circuit receives the row address selection signal, and an output terminal of the selection circuit is connected to an input terminal of the drive circuit and is configured to output a pulse signal with a same frequency as the row drive signal when the row address selection signal is valid, and output a write invalid signal when the row address selection signal is invalid;

wherein the drive circuit is configured to generate, based on the pulse signal, a write drive signal output with a driving capability, or output the write invalid signal;

wherein the selection circuit comprises a first series branch, a second series branch, a third series branch, and a fourth series branch;

wherein the first series branch comprises a first switching transistor and a second switching transistor that are connected in series, a control terminal of the first switching transistor is the input terminal of the selection circuit, a control terminal of the second switching transistor inputs a first voltage signal, and a first terminal of the first switching transistor is the output terminal of the selection circuit;

wherein the second series branch is connected in parallel to the first series branch, the second series branch comprises a third switching transistor and a fourth switching transistor that are connected in series, a common terminal of the third switching transistor and the fourth switching transistor inputs a negative voltage signal, a first terminal of the third switching transistor is connected to the output terminal of the selection circuit, gates of the third switching transistor and the fourth switching transistor are connected to a second terminal of the fourth switching transistor, and the second terminal of the fourth switching transistor is connected to the first series branch;

wherein the third series branch comprises a fifth switching transistor and a sixth switching transistor that are connected in series, a first terminal of the fifth switching transistor inputs the negative voltage signal, a second terminal of the sixth switching transistor inputs a positive voltage signal, and gates of the fifth switching transistor and the sixth switching transistor are connected to a common terminal of the first switching transistor and the second switching transistor; and wherein the fourth series branch comprises a seventh switching transistor and an eighth switching transistor that are connected in series, a first terminal of the seventh switching transistor inputs the positive voltage signal, a second terminal of the eighth switching transistor inputs the negative voltage signal, gates of the seventh switching transistor and the eighth switching transistor are connected to a serially-connected node of the fifth switching transistor and the sixth switching transistor and input the row address selection signal, and a serially-connected node of the seventh switching transistor and the eighth switching transistor is connected to the common terminal of the first switching transistor and the second switching transistor.

2. The screen drive circuit according to claim 1, wherein the row address selection signal is valid when it is a low-level signal and invalid when it is a high-level signal.

3. The screen drive circuit according to claim 1, wherein the drive circuit comprises a first CMOS inverter, an input terminal of the first CMOS inverter is connected to the output terminal of the selection circuit, an output terminal of the first CMOS inverter is an output terminal of the drive selection circuit, a first power terminal of the first CMOS inverter inputs the positive voltage signal, and a second power terminal of the first CMOS inverter inputs the negative voltage signal.

4. The screen drive circuit according to claim 3, wherein:

a control terminal of a ninth switching transistor inputs the row address selection signal, and a first terminal of the ninth switching transistor inputs the positive voltage signal;

a tenth switching transistor is connected in series to an eleventh switching transistor, a first terminal of the tenth switching transistor is connected to a second terminal of the ninth switching transistor, a control terminal of the tenth switching transistor inputs the first voltage signal, a second terminal of the eleventh switching transistor inputs the negative voltage signal, and a control terminal of the eleventh switching transistor is connected to a first terminal of the eleventh switching transistor; and a twelfth switching transistor is connected in series to a thirteenth switching transistor, a control terminal of the twelfth switching transistor is connected to the output terminal of the row drive circuit, a second terminal of the twelfth switching transistor is connected to a common node of the tenth switching transistor and the ninth switching transistor, a second terminal of the thirteenth switching transistor inputs the negative voltage signal, and a common terminal of the twelfth switching transistor and the thirteenth switching transistor is connected to the input terminal of the drive circuit.

5. The screen drive circuit according to claim 3, wherein the selection circuit comprises:

a fourteenth switching transistor, a fifteenth switching transistor, and a sixteenth switching transistor that are sequentially connected in series, wherein a first terminal of the fourteenth switching transistor inputs the positive voltage signal, and a second terminal of the sixteenth switching transistor inputs the negative voltage signal;

control terminals of the fourteenth switching transistor and the sixteenth switching transistor are connected to the row drive circuit, and a control terminal of the fifteenth switching transistor inputs the row address selection signal;

a common terminal of the fifteenth switching transistor and the sixteenth switching transistor is connected to the input terminal of the drive circuit; and a first terminal of a seventeenth switching transistor is connected to a second terminal of the fifteenth switching transistor, a second terminal of the seventeenth switching transistor inputs the negative voltage signal, and a control terminal of the seventeenth switching transistor inputs the row address selection signal.

6. The screen drive circuit according to claim 3, wherein the selection circuit further comprises a second CMOS inverter, a third CMOS inverter, a fifth series branch, a fourth CMOS inverter, and a fifth CMOS inverter;

an input terminal of the second CMOS inverter is connected to an output terminal of the row drive circuit, and an output terminal of the second CMOS inverter is connected to an input terminal of the third CMOS inverter;

the fifth series branch comprises an eighteenth switching transistor, a nineteenth switching transistor, and a twentieth switching transistor that are sequentially connected in series, a first terminal of the eighteenth switching transistor inputs the positive voltage signal, and a second terminal of the twentieth switching transistor inputs the negative voltage signal;

and control terminals of the eighteenth switching transistor and the twentieth switching transistor are connected to an output terminal of the third CMOS inverter, and a common terminal of the nineteenth switching transistor and the twentieth switching transistor is connected to the input terminal of the drive circuit;

an input terminal of the fourth CMOS inverter inputs the row address selection signal, and an output terminal of the fourth CMOS inverter is connected to an input terminal of the fifth CMOS inverter; and an output terminal of the fifth CMOS inverter is connected to control terminals of a twenty-first switching transistor and the nineteenth switching transistor, and a first terminal of the twenty-first switching transistor is connected to the input terminal of the drive circuit.

7. The screen drive circuit according to claim 3, wherein the selection circuit further comprises a sixth CMOS inverter, a sixth series branch, a seventh series branch, an eighth series branch, a seventh CMOS inverter, an eighth CMOS inverter, and a ninth CMOS inverter;

an input terminal of the sixth CMOS inverter inputs the row address selection signal;

and the sixth series branch comprises a twenty-second switching transistor, a control terminal of the twenty-second switching transistor is connected to an output terminal of the sixth CMOS inverter, a first terminal of the twenty-second switching transistor inputs the positive voltage signal, and a second terminal of the twenty-second switching transistor is connected to a first common node;

the seventh series branch comprises a twenty-third switching transistor, a control terminal of the twenty-third switching transistor is connected to a second common node, a first terminal of the twenty-third switching transistor inputs the positive voltage signal, and a second terminal of the twenty-third switching transistor is connected to the first common node;

the eighth series branch comprises a twenty-fourth switching transistor and a twenty-fifth switching transistor that are connected in series, a control terminal of the twenty-fourth switching transistor is connected to the second common node and a second terminal of the twenty-fourth switching transistor inputs the negative voltage signal, and a control terminal of the twenty-fifth switching transistor is connected to the output terminal of the sixth CMOS inverter;

an input terminal of the seventh CMOS inverter is connected to an output terminal of the eighth CMOS inverter, and an input terminal of the eighth CMOS inverter is connected to the output terminal of the row drive circuit; and an input terminal of the ninth CMOS inverter is connected to the first common node, and an output terminal of the ninth CMOS inverter is connected to the input terminal of the drive circuit.

8. The screen drive circuit according to claim 1, wherein:

a control terminal of a ninth switching transistor inputs the row address selection signal, and a first terminal of the ninth switching transistor inputs the positive voltage signal;

a tenth switching transistor is connected in series to an eleventh switching transistor, a first terminal of the tenth switching transistor is connected to a second terminal of the ninth switching transistor, a control terminal of the tenth switching transistor inputs the first voltage signal, a second terminal of the eleventh switching transistor inputs the negative voltage signal, and a control terminal of the eleventh switching transistor is connected to a first terminal of the eleventh switching transistor; and a twelfth switching transistor is connected in series to a thirteenth switching transistor, a control terminal of the twelfth switching transistor is connected to the output terminal of the row drive circuit, a second terminal of the twelfth switching transistor is connected to a common node of the tenth switching transistor and the ninth switching transistor, a second terminal of the thirteenth switching transistor inputs the negative voltage signal, and a common terminal of the twelfth switching transistor and the thirteenth switching transistor is connected to the input terminal of the drive circuit.

9. The screen drive circuit according to claim 1, wherein the selection circuit further comprises:

a fourteenth switching transistor, a fifteenth switching transistor, and a sixteenth switching transistor that are sequentially connected in series, wherein a first terminal of the fourteenth switching transistor inputs the positive voltage signal, and a second terminal of the sixteenth switching transistor inputs the negative voltage signal;

wherein control terminals of the fourteenth switching transistor and the sixteenth switching transistor are connected to the row drive circuit, and a control terminal of the fifteenth switching transistor inputs the row address selection signal;

wherein a common terminal of the fifteenth switching transistor and the sixteenth switching transistor is connected to the input terminal of the drive circuit; and wherein a first terminal of a seventeenth switching transistor is connected to a second terminal of the fifteenth switching transistor, a second terminal of the seventeenth switching transistor inputs the negative voltage signal, and a control terminal of the seventeenth switching transistor inputs the row address selection signal.

10. The screen drive circuit according to claim 1, wherein the selection circuit further comprises a second CMOS inverter, a third CMOS inverter, a fifth series branch, a fourth CMOS inverter, and a fifth CMOS inverter;

wherein an input terminal of the second CMOS inverter is connected to an output terminal of the row drive circuit, and an output terminal of the second CMOS inverter is connected to an input terminal of the third CMOS inverter;

wherein the fifth series branch comprises an eighteenth switching transistor, a nineteenth switching transistor, and a twentieth switching transistor that are sequentially connected in series, a first terminal of the eighteenth switching transistor inputs the positive voltage signal, and a second terminal of the twentieth switching transistor inputs the negative voltage signal; and control terminals of the eighteenth switching transistor and the twentieth switching transistor are connected to an output terminal of the third CMOS inverter, and a common terminal of the nineteenth switching transistor and the twentieth switching transistor is connected to the input terminal of the drive circuit;

wherein an input terminal of the fourth CMOS inverter inputs the row address selection signal, and an output terminal of the fourth CMOS inverter is connected to an input terminal of the fifth CMOS inverter; and wherein an output terminal of the fifth CMOS inverter is connected to control terminals of a twenty-first switching transistor and the nineteenth switching transistor, and a first terminal of the twenty-first switching transistor is connected to the input terminal of the drive circuit.

11. The screen drive circuit according to claim 1, wherein the selection circuit further comprises a sixth CMOS inverter, a sixth series branch, a seventh series branch, an eighth series branch, a seventh CMOS inverter, an eighth CMOS inverter, and a ninth CMOS inverter;

wherein an input terminal of the sixth CMOS inverter inputs the row address selection signal; and the sixth series branch comprises a twenty-second switching transistor, a control terminal of the twenty-second switching transistor is connected to an output terminal of the sixth CMOS inverter, a first terminal of the twenty-second switching transistor inputs the positive voltage signal, and a second terminal of the twenty-second switching transistor is connected to a first common node;

wherein the seventh series branch comprises a twenty-third switching transistor, a control terminal of the twenty-third switching transistor is connected to a second common node, a first terminal of the twenty-third switching transistor inputs the positive voltage signal, and a second terminal of the twenty-third switching transistor is connected to the first common node;

wherein the eighth series branch comprises a twenty-fourth switching transistor and a twenty-fifth switching transistor that are connected in series, a control terminal of the twenty-fourth switching transistor is connected to the second common node and a second terminal of the twenty-fourth switching transistor inputs the negative voltage signal, and a control terminal of the twenty-fifth switching transistor is connected to the output terminal of the sixth CMOS inverter;

wherein an input terminal of the seventh CMOS inverter is connected to an output terminal of the eighth CMOS inverter, and an input terminal of the eighth CMOS inverter is connected to the output terminal of the row drive circuit; and wherein an input terminal of the ninth CMOS inverter is connected to the first common node, and an output terminal of the ninth CMOS inverter is connected to the input terminal of the drive circuit.

12. The screen drive circuit according to claim 1, wherein the row drive circuit is a Gate-on-Array (GOA) circuit.

13. A display, comprising:

pixels;

a pixel drive array circuit; and a screen drive circuit, wherein an output terminal of the screen drive circuit is coupled to a row drive signal of the pixel drive array circuit, and the screen drive circuit comprises an array drive circuit and a drive selection circuit, wherein the array drive circuit comprises a row drive circuit and a column drive circuit;

wherein the row drive circuit generates a row drive signal that is used to drive a pixel row in the display; and wherein an input terminal of the drive selection circuit is connected to an output terminal of the row drive circuit, a control terminal of the drive selection circuit receives a row address selection signal and outputs, based on the row address selection signal, the row drive signal corresponding to a pixel row whose displayed content changes, and the row address selection signal is generated, by a display drive chip connected to the display, based on the pixel row whose displayed content changes;

wherein the drive selection circuit comprises a selection circuit and a drive circuit;

wherein an input terminal of the selection circuit is connected to the output terminal of the row drive circuit, a control terminal of the selection circuit receives the row address selection signal, and an output terminal of the selection circuit is connected to an input terminal of the drive circuit and is configured to output a pulse signal with a same frequency as the row drive signal when the row address selection signal is valid, and output a write invalid signal when the row address selection signal is invalid;

wherein the drive circuit is configured to generate, based on the pulse signal, a write drive signal output with a driving capability, or output the write invalid signal;

wherein the selection circuit comprises a first series branch, a second series branch, a third series branch, and a fourth series branch;

wherein the first series branch comprises a first switching transistor and a second switching transistor that are connected in series, a control terminal of the first switching transistor is the input terminal of the selection circuit, a control terminal of the second switching transistor inputs a first voltage signal, and a first terminal of the first switching transistor is the output terminal of the selection circuit;

wherein the second series branch is connected in parallel to the first series branch, the second series branch comprises a third switching transistor and a fourth switching transistor that are connected in series, a common terminal of the third switching transistor and the fourth switching transistor inputs a negative voltage signal, a first terminal of the third switching transistor is connected to the output terminal of the selection circuit, gates of the third switching transistor and the fourth switching transistor are connected to a second terminal of the fourth switching transistor, and the second terminal of the fourth switching transistor is connected to the first series branch;

wherein the third series branch comprises a fifth switching transistor and a sixth switching transistor that are connected in series, a first terminal of the fifth switching transistor inputs the negative voltage signal, a second terminal of the sixth switching transistor inputs a positive voltage signal, and gates of the fifth switching transistor and the sixth switching transistor are connected to a common terminal of the first switching transistor and the second switching transistor; and wherein the fourth series branch comprises a seventh switching transistor and an eighth switching transistor that are connected in series, a first terminal of the seventh switching transistor inputs the positive voltage signal, a second terminal of the eighth switching transistor inputs the negative voltage signal, gates of the seventh switching transistor and the eighth switching transistor are connected to a serially-connected node of the fifth switching transistor and the sixth switching transistor and input the row address selection signal, and a serially-connected node of the seventh switching transistor and the eighth switching transistor is connected to the common terminal of the first switching transistor and the second switching transistor.

14. The display according to claim 13, wherein the row address selection signal is valid when it is a low-level signal and invalid when it is a high-level signal.

15. The display according to claim 13, wherein the drive circuit comprises a first CMOS inverter, an input terminal of the first CMOS inverter is connected to the output terminal of the selection circuit, an output terminal of the first CMOS inverter is an output terminal of the drive selection circuit, a first power terminal of the first CMOS inverter inputs the positive voltage signal, and a second power terminal of the first CMOS inverter inputs the negative voltage signal.

16. The display according to claim 13, wherein the row drive circuit is a Gate-on-Array (GOA) circuit.

17. An electronic device, comprising:

one or more processors;

memory; and a display, comprising:

pixels;

a pixel drive array circuit; and a screen drive circuit, wherein an output terminal of the screen drive circuit is coupled to a row drive signal of the pixel drive array circuit, and the screen drive circuit comprises an array drive circuit and a drive selection circuit, and wherein the array drive circuit comprises a row drive circuit and a column drive circuit;

wherein the row drive circuit generates a row drive signal that is used to drive a pixel row in the display; and wherein an input terminal of the drive selection circuit is connected to an output terminal of the row drive circuit, a control terminal of the drive selection circuit receives a row address selection signal and outputs, based on the row address selection signal, the row drive signal corresponding to a pixel row whose displayed content changes, and the row address selection signal is generated, by a display drive chip connected to the display, based on the pixel row whose displayed content changes;

wherein the drive selection circuit comprises a selection circuit and a drive circuit;

wherein an input terminal of the selection circuit is connected to the output terminal of the row drive circuit, a control terminal of the selection circuit receives the row address selection signal, and an output terminal of the selection circuit is connected to an input terminal of the drive circuit and is configured to output a pulse signal with a same frequency as the row drive signal when the row address selection signal is valid, and output a write invalid signal when the row address selection signal is invalid;

wherein the drive circuit is configured to generate, based on the pulse signal, a write drive signal output with a driving capability, or output the write invalid signal;

wherein the selection circuit comprises a first series branch, a second series branch, a third series branch, and a fourth series branch;

wherein the first series branch comprises a first switching transistor and a second switching transistor that are connected in series, a control terminal of the first switching transistor is the input terminal of the selection circuit, a control terminal of the second switching transistor inputs a first voltage signal, and a first terminal of the first switching transistor is the output terminal of the selection circuit;

wherein the second series branch is connected in parallel to the first series branch, the second series branch comprises a third switching transistor and a fourth switching transistor that are connected in series, a common terminal of the third switching transistor and the fourth switching transistor inputs a negative voltage signal, a first terminal of the third switching transistor is connected to the output terminal of the selection circuit, gates of the third switching transistor and the fourth switching transistor are connected to a second terminal of the fourth switching transistor, and the second terminal of the fourth switching transistor is connected to the first series branch;

wherein the third series branch comprises a fifth switching transistor and a sixth switching transistor that are connected in series, a first terminal of the fifth switching transistor inputs the negative voltage signal, a second terminal of the sixth switching transistor inputs a positive voltage signal, and gates of the fifth switching transistor and the sixth switching transistor are connected to a common terminal of the first switching transistor and the second switching transistor; and wherein the fourth series branch comprises a seventh switching transistor and an eighth switching transistor that are connected in series, a first terminal of the seventh switching transistor inputs the positive voltage signal, a second terminal of the eighth switching transistor inputs the negative voltage signal, gates of the seventh switching transistor and the eighth switching transistor are connected to a serially-connected node of the fifth switching transistor and the sixth switching transistor and input the row address selection signal, and a serially-connected node of the seventh switching transistor and the eighth switching transistor is connected to the common terminal of the first switching transistor and the second switching transistor.

18. The electronic device according to claim 17, wherein the row address selection signal is valid when it is a low-level signal and invalid when it is a high-level signal.

19. The electronic device according to claim 17, wherein the drive circuit comprises a first CMOS inverter, an input terminal of the first CMOS inverter is connected to the output terminal of the selection circuit, an output terminal of the first CMOS inverter is an output terminal of the drive selection circuit, a first power terminal of the first CMOS inverter inputs the positive voltage signal, and a second power terminal of the first CMOS inverter inputs the negative voltage signal.

20. The electronic device according to claim 17, wherein the row drive circuit is a Gate-on-Array (GOA) circuit.

* * * * *